15# United States Patent [19]

Mahmud et al.

[11] Patent Number: 5,869,550
[45] Date of Patent: Feb. 9, 1999

US005869550A

[54] METHOD TO IMPROVE TRACTION USING SILICON-TREATED CARBON BLACKS

[75] Inventors: Khaled Mahmud, Tyngsboro; Meng-Jiao Wang, Lexington, both of Mass.

[73] Assignee: Cabot Corporation, Boston, Mass.

[21] Appl. No.: 826,391

[22] Filed: Apr. 9, 1997

Related U.S. Application Data

[63] Continuation-in-part of Ser. No. 446,141, May 22, 1995, Ser. No. 446,142, May 22, 1995, Ser. No. 528,895, Sep. 15, 1995, abandoned, and Ser. No. 750,017, Aug. 14, 1997.

[51] Int. Cl.$^6$ .............................. C08K 3/00; C08K 3/18
[52] U.S. Cl. .................... 523/215; 524/398; 524/262; 524/259; 524/424; 524/495; 524/578; 524/579; 524/570
[58] Field of Search ........................... 523/215; 524/495; 524/578, 579, 570, 262, 259, 398, 424

[56] References Cited

U.S. PATENT DOCUMENTS

| T860,001 | 3/1969 | Gessler . | |
|---|---|---|---|
| 1,999,573 | 4/1935 | Odell | 134/60 |

(List continued on next page.)

FOREIGN PATENT DOCUMENTS

| 0 006 190 A1 | 1/1980 | European Pat. Off. . | |
|---|---|---|---|
| 0 468 140 A2 | 1/1992 | European Pat. Off. . | |
| 0 475 075 A1 | 3/1992 | European Pat. Off. . | |
| 0 050 354 | 4/1992 | European Pat. Off. . | |
| 0 572 792 A1 | 12/1993 | European Pat. Off. . | |
| 675 175 | 10/1995 | European Pat. Off. . | |
| 0 711 805 A1 | 5/1996 | European Pat. Off. . | |
| 0 799 854 A1 | 10/1997 | European Pat. Off. . | |
| 0 799 867 A1 | 10/1997 | European Pat. Off. . | |
| 1 459 019 | of 0000 | France . | |
| 1 499 348 | of 0000 | France . | |
| E 72775 | 4/1960 | France . | |
| 1230893 | 9/1960 | France . | |
| 1331889 | 5/1963 | France . | |
| 3 502 494 | of 0000 | Germany . | |
| 1 948 443 | 4/1971 | Germany . | |
| 2 355 758 | 5/1975 | Germany . | |
| 3 813 678 A1 | 11/1988 | Germany . | |
| 195 20 946 A1 | 12/1996 | Germany . | |
| 8073657 | of 0000 | Japan . | |
| 56-078629 | 6/1981 | Japan . | |
| 59-82467 | 5/1984 | Japan . | |
| 62-250073 | 10/1987 | Japan . | |
| 5-178604 | 7/1993 | Japan . | |
| 6067421 | 3/1994 | Japan . | |
| 0 862 018 | 3/1961 | United Kingdom . | |
| 1139620 | 1/1969 | United Kingdom | 106/475 |
| 1191872 | 5/1970 | United Kingdom . | |
| 1213186 | 11/1970 | United Kingdom . | |
| 1363428 | 8/1974 | United Kingdom . | |
| 1363429 | 8/1974 | United Kingdom . | |
| 2044741 | 10/1980 | United Kingdom . | |
| 2 188 311 | 9/1987 | United Kingdom . | |
| 2 296 915 | 7/1996 | United Kingdom . | |
| WO 91/02034 | 8/1990 | WIPO . | |
| WO 91/15425 | 1/1991 | WIPO . | |
| WO 92/13983 | 8/1992 | WIPO . | |
| WO 95/01838 | 1/1995 | WIPO . | |
| WO 96/18688 | 6/1996 | WIPO . | |
| WO 96/18689 | 6/1996 | WIPO . | |
| WO 96/18694 | 6/1996 | WIPO . | |
| WO 96/18695 | 6/1996 | WIPO . | |
| WO 96/18696 | 6/1996 | WIPO . | |
| WO 96/37546 | 11/1996 | WIPO . | |
| WO 96/37547 | 11/1996 | WIPO . | |
| ISR 96/14583 | 2/1997 | WIPO . | |
| WO 97/10291 | 3/1997 | WIPO . | |
| ISR 97/08049 | 5/1997 | WIPO . | |
| ISR 97/08854 | 11/1997 | WIPO . | |
| ISR 97/17134 | 1/1998 | WIPO . | |

OTHER PUBLICATIONS

International Search Report dated Aug. 3, 1998, for PCT/US/07369 filed Apr. 9, 1998.

Derwent Publication No. XP–002071838, Week 9723, Class A26, AN 97–255815, JP 09 087 612 A (Nissan Motor Co. Ltd.) (Abstract).

Derwent Abstract, AN No. 80–03330C, "Sulphonated Carbon Pigment Production by Treating Technical Grade Carbon with Hot Aqueous Acid," SU,A,659, 523, Apr. 1979.

Derwent Abstract, AN No. 82–28019E, "Penetrating Flexographic Print Ink Based Polyacrylic Resin," Oct. 17, 1979, SU,A, 834062.

Derwent Abstract, AN No. 86–335147, "Wear Resistant Rubber Composition for Tire Tread Rubber," Apr. 30, 1985, JPA 61–250042, Nov. 1986.

Derwent Abstract, AN No. 88–116672 "Surface Treatment of Carbon Black for Powder Coating . . . ," Mar. 22, 1988, JPA 86 0208468.

Derwent Abstract, AN No. 93–261471, "Carbon Black for Coating Magnetic Recording Media—Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Oct. 21, 1993, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964, no month.

(List continued on next page.)

Primary Examiner—Andrew E. C. Merriam

[57] ABSTRACT

A method of improving traction in an elastomer is disclosed. The method includes the step of adding an effective amount of an aggregate comprising a carbon phase and a silicon-containing species phase to an elastomer. Also disclosed is a method of improving the dynamic compliance of an elastomer which includes the step of adding an effective amount of an aggregate comprising a carbon phase and a silicon-containing species phase to the elastomer. The elastomer is preferably used in tires and results in improved traction, for instance, improved skid resistance on ice and snow.

53 Claims, 7 Drawing Sheets

U.S. PATENT DOCUMENTS

| | | | |
|---|---|---|---|
| 2,121,535 | 6/1938 | Amon | 106/475 |
| 2,375,795 | 5/1945 | Krejci | 23/209.8 |
| 2,439,442 | 4/1948 | Amon et al. | 23/209.1 |
| 2,564,700 | 8/1951 | Krejci | 23/209.4 |
| 2,632,713 | 3/1953 | Krejci | 106/307 |
| 2,793,100 | 5/1957 | Weihe | 423/460 |
| 2,867,540 | 1/1959 | Harris | 106/476 |
| 3,011,902 | 12/1961 | Jordon | 106/30 R |
| 3,025,259 | 3/1962 | Watson et al. | 106/476 |
| 3,094,428 | 6/1963 | Hamilton et al. | 106/307 |
| 3,188,225 | 6/1965 | Walker | 106/291 |
| 3,203,819 | 8/1965 | Steenken et al. | 106/307 |
| 3,290,165 | 12/1966 | Iannicelli | 106/308 |
| 3,317,458 | 5/1967 | Clas et al. | 260/41.5 |
| 3,335,020 | 8/1967 | Aboytes et al. | 106/476 |
| 3,390,006 | 6/1968 | Takewell et al. | 106/475 |
| 3,423,391 | 1/1969 | Kindler et al. | 106/20 R |
| 3,528,840 | 9/1970 | Aboytes | 106/473 |
| 3,622,650 | 11/1971 | Berstein et al. | 260/763 |
| 3,660,132 | 5/1972 | Illigen et al. | 106/307 |
| 3,663,285 | 5/1972 | Graf et al. | 106/308 |
| 3,671,476 | 6/1972 | Terai et al. | 260/23 |
| 3,686,111 | 8/1972 | Makhloaf et al. | 524/530 |
| 3,689,452 | 9/1972 | Burke, Jr. | 260/33.6 |
| 3,716,513 | 2/1973 | Burke, Jr. | 260/33.6 |
| 3,997,356 | 12/1976 | Thurn et al. | 106/288 |
| 4,006,031 | 2/1977 | Ferch et al. | 106/473 |
| 4,014,844 | 3/1977 | Vidal et al. | 106/472 |
| 4,108,679 | 8/1978 | Szczepanik et al. | 106/307 |
| 4,211,578 | 7/1980 | Scott, IV | 106/475 |
| 4,221,693 | 9/1980 | Getson et al. | 260/37 |
| 4,265,768 | 5/1981 | Beasley et al. | 210/682 |
| 4,297,145 | 10/1981 | Wolff et al. | 106/308 |
| 4,320,011 | 3/1982 | Sato et al. | 210/694 |
| 4,366,139 | 12/1982 | Kühner et al. | 423/449 |
| 4,452,638 | 6/1984 | Gallus | 106/97 |
| 4,530,961 | 7/1985 | Nguyen et al. | 106/20 R |
| 4,537,633 | 8/1985 | Hong | 106/96 |
| 4,590,052 | 5/1986 | Chevallier et al. | 423/335 |
| 4,597,794 | 7/1986 | Ohta et al. | 106/20 C |
| 4,670,059 | 6/1987 | Hackleman et al. | 106/475 |
| 4,751,204 | 6/1988 | Kyoden et al. | 501/89 |
| 4,820,751 | 4/1989 | Takeshita et al. | 523/215 |
| 4,831,011 | 5/1989 | Oikawa et al. | 502/406 |
| 4,929,391 | 5/1990 | Kroupa | 252/511 |
| 5,130,363 | 7/1992 | Scholl et al. | 524/392 |
| 5,149,732 | 9/1992 | Igarashi et al. | 524/426 |
| 5,159,009 | 10/1992 | Wolff et al. | 106/475 |
| 5,184,148 | 2/1993 | Suga et al. | 106/20 R |
| 5,190,582 | 3/1993 | Shinozuka et al. | 106/20 D |
| 5,227,425 | 7/1993 | Rauline | 524/493 |
| 5,281,261 | 1/1994 | Lin | 106/20 R |
| 5,282,887 | 2/1994 | Gay et al. | 106/261 |
| 5,286,291 | 2/1994 | Bernhardt et al. | 106/475 |
| 5,294,253 | 3/1994 | Carlson et al. | 106/475 |
| 5,328,949 | 7/1994 | Sandstrom et al. | 524/262 |
| 5,336,730 | 8/1994 | Sandstrom et al. | 524/492 |
| 5,401,313 | 3/1995 | Supplee et al. | 106/475 |
| 5,401,789 | 3/1995 | Wolff et al. | 523/213 |
| 5,430,087 | 7/1995 | Carlson et al. | 106/475 |
| 5,502,146 | 3/1996 | Inoue et al. | 528/34 |
| 5,554,739 | 9/1996 | Belmont | 534/885 |
| 5,559,169 | 9/1996 | Belmont et al. | 523/215 |
| 5,571,311 | 11/1996 | Belmont et al. | 106/20 R |
| 5,575,845 | 11/1996 | Belmont et al. | 106/712 |
| 5,580,919 | 12/1996 | Agostini et al. | 524/495 |
| 5,622,557 | 4/1997 | Mahmud et al. | 106/712 |
| 5,630,868 | 5/1997 | Belmont et al. | 106/31.75 |
| 5,654,357 | 8/1997 | Menashi et al. | 524/495 |
| 5,672,198 | 9/1997 | Belmont | 106/20 |
| 5,679,728 | 10/1997 | Kawazura et al. | 523/215 |
| 5,698,016 | 12/1997 | Adams et al. | 106/31.6 |
| 5,707,432 | 1/1998 | Adams et al. | 106/31.6 |
| 5,713,988 | 2/1998 | Belmont et al. | 106/31.6 |

OTHER PUBLICATIONS

Roberts et al., *Basic Principles of Organic Chemistry*, Second Edition, W.A. Benjamin, Inc., Pub., p. 1080, no date available.

Zoheidi et al., "Role of Oxygen Surface Groups in Catalysis of Hydrogasification of Carbon Black by Potassium Carbonate," *Carbon*, vol. 25, No. 6, pp. 809–819, 1987, no month available.

Delamar et al., J. Am. Chem. Soc. 1992, 114, 5883–5884, no month available.

Concise Encyclopedia of Polymer Science and Engineering, Wiley, 1990, pp. 104–105.

Carbon (Carbon Black) reprinted from Kirk–Othmer: Encyclopedia of Chemical Technology, vol. 4, Third Edition, pp. 631–643, 1978.

25 nm
N234 Carbon Black 25 nm
N234 Carbon
Black-HF Treated 25 nm
OMTS Carbon Black 25 nm
OMTS Carbon
Black-HF Treated

METHOD TO IMPROVE TRACTION USING SILICON-TREATED CARBON BLACKS

REFERENCE TO RELATED APPLICATIONS

The present invention is a continuation-in-part of U.S. patent applications Ser. Nos. 08/446,141, filed May 22, 1995; 08/446,142, filed May 22, 1995; 08/528,895, filed Sep. 15, 1995, now abandoned; and 08/750,017, filed Aug. 14, 1997, which is a national phase application of PCT No. WO 96/37547, filed May 21, 1996. All of these applications are incorporated in their entireties herein by reference.

FIELD OF THE INVENTION

The present invention relates to the use of elastomeric compounds containing silicon-treated carbon blacks to improve traction properties.

BACKGROUND OF THE INVENTION

Carbon blacks are widely used as pigments, fillers and reinforcing agents in the compounding and preparation of rubber and other elastomeric compounds. Carbon blacks are particularly useful as reinforcing agents in the preparation of elastomeric compounds used in the manufacture of tires.

Carbon blacks are generally produced in a furnace-type reactor by pyrolyzing a hydrocarbon feedstock with hot combustion gases to produce combustion products containing particulate carbon black. Carbon black exists in the form of aggregates. The aggregates, in turn are formed of carbon black particles. However, carbon black particles do not generally exist independently of the carbon black aggregate. Carbon blacks are generally characterized on the basis of analytical properties, including, but not limited to particle size and specific surface area; aggregate size, shape, and distribution; and chemical and physical properties of the surface. The properties of carbon blacks are analytically determined by tests known to the art. For example, nitrogen adsorption surface area (measured by ASTM test procedure D3037—Method A) and cetyl-trimethyl ammonium bromide adsorption value (CTAB) (measured by ASTM test procedure D3765 [09.01]), are measures of specific surface area. Dibutylphthalate absorption of the crushed (CDBP) (measured by ASTM test procedure D3493-86) and uncrushed (DBP) carbon black (measured by ASTM test procedure D2414-93), relates to the aggregate structure. The bound rubber value relates to the surface activity of the carbon black. The properties of a given carbon black depend upon the conditions of manufacture and may be modified, e.g., by altering temperature, pressure, feedstock, residence time, quench temperature, throughput, and other parameters.

It is generally desirable in the production of tires to employ carbon black-containing compounds when constructing the tread and other portions of the tire. For example, a suitable tread compound will employ an elastomer compounded to provide high abrasion resistance and good hysteresis balance at different temperatures. A tire having high abrasion resistance is desirable because abrasion resistance is proportional to tire life. The physical properties of the carbon black directly influence the abrasion resistance and hysteresis of the tread compound. Generally, a carbon black with a high surface area and small particle size will impart a high abrasion resistance and high hysteresis to the tread compound. Carbon black loading also affects the abrasion resistance of the elastomeric compounds. Abrasion resistance increases with increased loading, at least to an optimum point, beyond which abrasion resistance actually decreases.

The hysteresis of an elastomeric compound relates to the energy dissipated under cyclic deformation. In other words, the hysteresis of an elastomeric composition relates to the difference between the energy applied to deform the elastomeric composition and the energy released as the elastomeric composition recovers to its initial undeformed state. Hysteresis is characterized by a loss tangent, tan $\delta$, which is a ratio of the loss modulus to the storage modulus (that is, viscous modulus to elastic modulus). Tires made with a tire tread compound having a lower hysteresis measured at higher temperatures, such as 40° C. or higher, will have reduced rolling resistance, which in turn, results in reduced fuel consumption by the vehicle using the tire. At the same time, a tire tread with a higher hysteresis value measured at low temperature, such as 0° C. or lower, will result in a tire with high wet traction and skid resistance which will increase driving safety. Thus, a tire tread compound demonstrating low hysteresis at high temperatures and high hysteresis at low temperatures can be said to have a good hysteresis balance.

There are many other applications where it is useful to provide an elastomer exhibiting a good hysteresis balance but where the abrasion resistance is not an important factor. Such applications include but are not limited to tire components such as undertread, wedge compounds, sidewall, carcass, apex, bead filler and wire skim; engine mounts; and base compounds used in industrial drive and automotive belts.

In addition, the skid resistance of a tire on ice and/or snow is an important property, particularly for winter tires. One way to quantify skid resistance in a tire is by measuring the dynamic compliance at −20° C. In particular, the higher the dynamic compliance at −20° C., the higher the skid resistance on ice as well as on packed snow. (S. Futamura, *Rubber Chem. Technology*, 69, 648 (1996), incorporated herein by reference.) In other words, traction is improved by a showing of high dynamic compliance at −20° C.

Silica is also used as a reinforcing agent (or filler) for elastomers. However, using silica alone as a reinforcing agent for elastomer leads to poor performance compared to the results obtained with carbon black alone as the reinforcing agent. It is theorized that strong filler-filler interaction and poor filler-elastomer interaction accounts for the poor performance of silica. The silica-elastomer interaction can be improved by chemically bonding the two with a chemical coupling agent, such as bis (3-triethoxysilylpropyl) tetrasulfane, commercially available as Si-69 from Degussa AG, Germany. Coupling agents such as Si-69 create a chemical linkage between the elastomer and the silica, thereby coupling the silica to the elastomer.

When the silica is chemically coupled to the elastomer, certain performance characteristics of the resulting elastomeric composition are enhanced. When incorporated into vehicle tires, such elastomeric compounds provide improved hysteresis balance. However, elastomer compounds containing silica as the primary reinforcing agent exhibit low thermal conductivity, high electrical resistivity, high density and poor processability.

When carbon black alone is used as a reinforcing agent in elastomeric compositions, it does not chemically couple to the elastomer but the carbon black surface provides many sites for interacting with the elastomer. While the use of a coupling agent with carbon black might provide some improvement in performance to an elastomeric composition, the improvement is not comparable to that obtained when using a coupling agent with silica.

SUMMARY OF THE INVENTION

It is an object of the present invention to provide a method for improving the dynamic compliance at −20° C. in a tire. An additional object is to provide a method to improve traction, preferably ice and snow traction, in a tire.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description including the drawings and appended claims.

To achieve these and other advantages and in accordance with the purpose of the present invention, as embodied and broadly described herein, the present invention is directed to a method for improving traction in an elastomer which includes adding an effective amount of a silicon-treated carbon black to the elastomer. The present invention further relates to a method for improving the dynamic compliance at −20° C. in an elastomer which includes adding an effective amount of a silicon-treated carbon black to the elastomer. The elastomer prepared from each method can be formed into tires or other elastomeric parts and products.

It is to be understood that both the foregoing general description and the following detailed description are exemplary and explanatory only and are intended to provide further explanation of the present invention, as claimed.

The accompanying drawings, which are incorporated in and constitute a part of this specification, illustrate one embodiment of the present invention and together with the description, serve to explain the principles of the present invention.

DETAILED DESCRIPTION OF THE INVENTION

Figure 1:
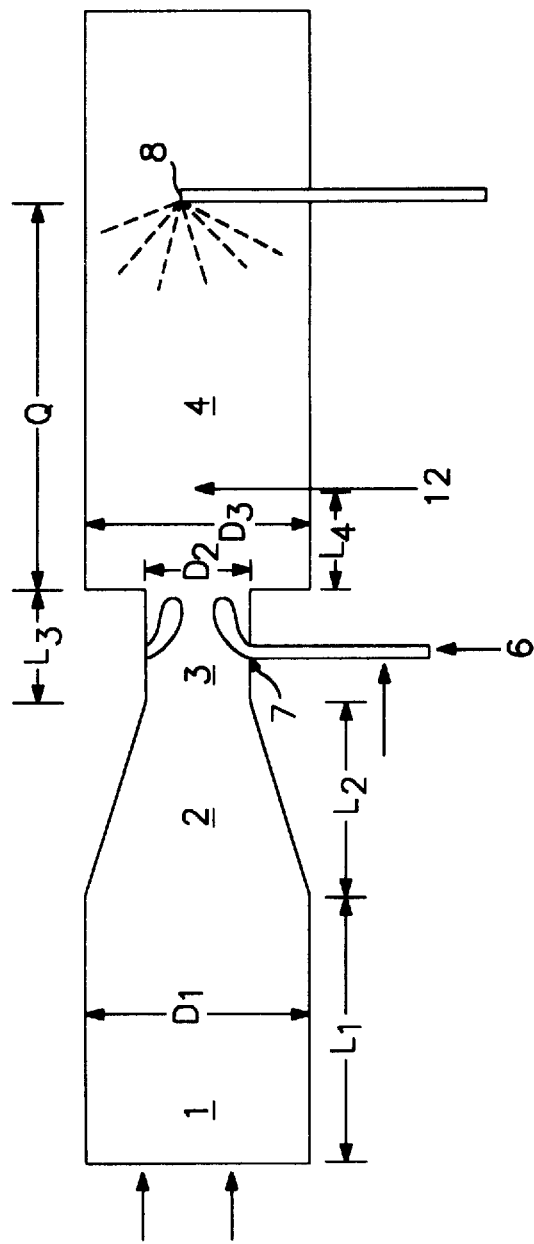
FIG. 1 is a schematic view of a portion of one type of carbon black reactor which may be used to produce the treated carbon blacks of the present invention.

The present inventors have discovered that elastomeric compounds having desirable traction and dynamic compliance properties may be obtained by compounding an elastomer with a silicon-treated carbon black. In the silicon-treated carbon black, a silicon-containing species, including but not limited to, oxides and carbides of silicon, may be distributed through at least a portion of the carbon black aggregate as an intrinsic part of the carbon black.

Silicon-treated carbon black aggregates do not represent a mixture of discrete carbon black aggregates and discrete silica aggregates. Rather, the silicon-treated carbon black aggregates of the present invention include at least one silicon-containing region either at the surface of or within the carbon black aggregate.

When the silicon-treated carbon black is examined under STEM-EDX, the silicon signal corresponding to the silicon-containing species is found to be present in individual carbon black aggregates. By comparison, for example, in a physical mixture of silica and carbon black, STEM-EDX examination reveals distinctly separate silica and carbon black aggregates.

An alternative way to describe the silicon-treated carbon black aggregates is an aggregate comprising a carbon phase and a silicon containing species phase. The aggregate, thus contains at least two phases, one of which is carbon and the other of which is a silicon containing species. The silicon containing species that is part of the aggregate is not attached to a carbon black aggregate like a silane coupling agent, but actually is part of the same aggregate as the carbon phase.

The improvement of traction properties obtained with the use of the silicon-treated carbon black with an elastomer can be measured a number of ways. Traction, and an improvement therein, relates in general to the traction of an elastomer to a surface, such as a road surface. Traction, for purposes of the present invention, includes, but is not limited to, dry traction, wet traction, ice, and/or snow traction. For instance, ice traction is correlated with the dynamic compliance at −20° C. Dynamic compliance (1/G) is measured by a Rheometrics Dynamic Spectrometer II (RDS II, Rheometrics Inc., N.J.) at a frequency of 10 Hz and double strain amplitudes (DSA) of 0.25% and 1.5%. An increase in dynamic compliance at −20° C. is proportional to an increase in skid resistance on ice as well as packed snow. In determining an improved traction in general, an elastomer compounded with a silicon-treated carbon black is compared to an elastomer having no silicon-treated carbon black present, but only conventional carbon black present.

The elastomer compounded with a silicon-treated carbon black has been compared with an elastomer compounded with just carbon black and it has been shown that an increase in dynamic compliance is achieved when the elastomer is instead compounded with silicon-treated carbon black. Preferably, the dynamic compliance at −20° C. can be increased, compared to an elastomer containing carbon black alone, from about 10% to about 55%, more preferably from about 16% to about 51%.

The silicon-treated carbon blacks may be obtained by manufacturing the carbon black in the presence of volatizable silicon-containing compounds. Such carbon blacks are preferably produced in a modular or "staged," furnace carbon black reactor as depicted in FIG. 1. The furnace carbon black reactor has a combustion zone 1, with a zone of converging diameter 2; a feedstock injection zone with restricted diameter 3; and a reaction zone 4.

To produce carbon blacks with the reactor described above, hot combustion gases are generated in combustion zone 1 by contacting a liquid or gaseous fuel with a suitable oxidant stream such as air, oxygen, or mixtures of air and oxygen. Among the fuels suitable for use in contacting the oxidant stream in combustion zone 1, to generate the hot combustion gases, are included any readily combustible gas, vapor or liquid streams such as natural gas, hydrogen, methane, acetylene, alcohols, or kerosene. It is generally preferred, however, to use fuels having a high content of carbon-containing components and in particular, hydrocarbons. The ratio of air to fuel varies with the type of fuel utilized. When natural gas is used to produce the carbon blacks of the present invention, the ratio of air to fuel may be from about 10:1 to about 1000:1. To facilitate the generation of hot combustion gases, the oxidant stream may be pre-heated.

The hot combustion gas stream flows downstream from zones 1 and 2 into zones 3 and 4. The direction of the flow of hot combustion gases is shown in FIG. 1 by the arrow. Carbon black feedstock, 6, is introduced at point 7 into the feedstock injection zone 3. The feedstock is injected into the gas stream through nozzles designed for optimal distribution of the oil in the gas stream. Such nozzles may be either single or bi-fluid. Bi-fluid nozzles may use steam or air to atomize the fuel. Single-fluid nozzles may be pressure atomized or the feedstock can be directly injected into the gas-stream. In the latter instance, atomization occurs by the force of the gas-stream.

Carbon blacks can be produced by the pyrolysis or partial combustion of any liquid or gaseous hydrocarbon. Preferred carbon black feedstocks include petroleum refinery sources such as decanted oils from catalytic cracking operations, as well as the by-products from coking operations and olefin manufacturing operations.

The mixture of carbon black-yielding feedstock and hot combustion gases flows downstream through zone 3 and 4. In the reaction zone portion of the reactor, the feedstock is pyrolyzed to carbon black. The reaction is arrested in the quench zone of the reactor. Quench 8 is located downstream of the reaction zone and sprays a quenching fluid, generally water, into the stream of newly formed carbon black particles. The quench serves to cool the carbon black particles and to reduce the temperature of the gaseous stream and decrease the reaction rate. Q is the distance from the beginning of reaction zone 4 to quench point 8, and will vary according to the position of the quench. Optionally, quenching may be staged, or take place at several points in the reactor.

After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter or other means known to those skilled in the art. After the carbon black has been separated from the gas stream, it is optionally subjected to a pelletization step.

The silicon treated carbon blacks of the present invention may be made by introducing a volatizable silicon containing compound into the carbon black reactor at a point upstream of the quench zone. Useful volatizable compounds include any compound, which is volatizable at carbon black reactor temperatures. Examples include, but are not limited to, silicates such as tetraethoxy orthosilicate (TEOS) and tetramethoxy orthosilicate, silanes such as, tetrachloro silane, and trichloro methylsilane; and volatile silicone polymers such as octamethylcyclotetrasiloxane (OMTS). The flow rate of the volatizable compound will determine the weight percent of silicon in the treated carbon black. The weight percent of silicon in the treated carbon black should range from about 0.1% to 25%, and preferably about 0.5% to about 10%, and most preferably about 2% to about 6%, by weight of the aggregate. It has been found that injecting silicon containing compound into the carbon black reactor results in an increase in the structure (e.g., CDBP) of the product. This is desirable in many applications of carbon black.

The volatizable compound may be premixed with the carbon black-forming feedstock and introduced with the feedstock into the reaction zone. Alternatively, the volatizable compound may be introduced to the reaction zone separately from the feedstock injection point. Such introduction may be upstream or downstream from the feedstock injection point, provided the volatizable compound is introduced upstream from the quench zone. For example, referring to FIG. 1, the volatizable compound may be introduced to zone Q at point 12 or any other point in the zone. Upon volatilization and exposure to high temperatures in the reactor, the compound decomposes, and reacts with other species in the reaction zone, yielding silicon treated carbon black, such that the silicon, or silicon containing species, becomes an intrinsic part of the carbon black. An example of a silicon-containing species is silica. Besides volatizable compounds, decomposable compounds which are not necessarily volatizable can also be used to yield the silicon-treated carbon black.

As discussed in further detail below, if the volatizable compound is introduced substantially simultaneously with the feedstock, the silicon-treated regions are distributed throughout at least a portion of the carbon black aggregate.

In a second embodiment of the present invention, the volatizable compound is introduced to the reaction zone at a point after carbon black formation has commenced but before the reaction stream has been subjected to the quench. In this embodiment, silicon-treated carbon black aggregates are obtained in which a silicon containing species is present primarily at or near the surface of the carbon black aggregate.

It has been found by the present inventors that the elastomeric compounds incorporating a treated carbon black may be additionally compounded with one or more coupling agents to further enhance the properties of the elastomeric compound. Coupling agents, as used herein, include, but are not limited to, compounds that are capable of coupling fillers such as carbon black or silica to an elastomer. Coupling agents useful for coupling silica or carbon black to an elastomer, are expected to be useful with the silicon-treated carbon blacks. Useful coupling agents include, but are not limited to, silane coupling agents such as bis(3-triethoxysilylpropyl)tetrasulfane (Si-69), 3-thiocyanatopropyl-triethoxy silane (Si-264, from Degussa AG, Germany), γ-mercaptopropyl-trimethoxy silane (A189, from Union Carbide Corp., Danbury, Conn.); zirconate coupling agents, such as zirconium dineoalkanolatodi(3-mercapto) propionato-O (NZ 66A, from Kenrich Petrochemicals, Inc., of Bayonne, N.J.); titanate coupling agents; nitro coupling agents such as N,N'-bis(2-methyl-2-nitropropyl)-1,6-diaminohexane (Sumifine 1162, from Sumitomo Chemical Co., Japan); and mixtures of any of the foregoing. The coupling agents may be provided as a mixture with a suitable carrier, for example X50-S which is a mixture of Si-69 and N330 carbon black, available from Degussa AG.

The coupling agent can be present in an amount of from about 0.1 to 15 parts per hundred of elastomer and more preferably in an amount of from about 0.1 to about 6 parts per hundred of elastomer.

The silicon-treated carbon black incorporated in the elastomeric compound of the present invention may be oxidized and/or combined with a coupling agent. Suitable oxidizing agents include, but are not limited to, nitric acid and ozone. Coupling agents which may be used with the oxidized carbon blacks include, but are not limited to, any of the coupling agents set forth above.

The silicon-treated carbon blacks of the present invention may have an organic group attached.

One process for attaching an organic group to the carbon black involves the reaction of at least one diazonium salt with a carbon black in the absence of an externally applied current sufficient to reduce the diazonium salt. That is, the reaction between the diazonium salt and the carbon black proceeds without an external source of electrons sufficient to reduce the diazonium salt. Mixtures of different diazonium salts may be used in the process of the invention. This process can be carried out under a variety of reaction conditions and in any type of reaction medium, including both protic and aprotic solvent systems or slurries.

In another process, at least one diazonium salt reacts with a carbon black in a protic reaction medium. Mixtures of different diazonium salts may be used in this process of the invention. This process can also be carried out under a variety of reaction conditions.

Preferably, in both processes, the diazonium salt is formed in situ. If desired, in either process, the carbon black product can be isolated and dried by means known in the art. Furthermore, the resultant carbon black product can be treated to remove impurities by known techniques. The various preferred embodiments of these processes are discussed below.

These processes can be carried out under a wide variety of conditions and in general are not limited by any particular condition. The reaction conditions must be such that the particular diazonium salt is sufficiently stable to allow it to react with the carbon black. Thus, the processes can be carried out under reaction conditions where the diazonium salt is short lived. The reaction between the diazonium salt and the carbon black occurs, for example, over a wide range of pH and temperature. The processes can be carried out at acidic, neutral, and basic pH. Preferably, the pH ranges from about 1 to 9. The reaction temperature may preferably range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry: Reactions, Mechanisms, and Structures*, 4th Ed., (Wiley, 1992). According to this invention, a diazonium salt is an organic compound having one or more diazonium groups.

The diazonium salt may be prepared prior to reaction with the carbon black or, more preferably, generated in situ using techniques known in the art. In situ generation also allows the use of unstable diazonium salts such as alkyl diazonium salts and avoids unnecessary handling or manipulation of the diazonium salt. In particularly preferred processes, both the nitrous acid and the diazonium salt are generated in situ.

A diazonium salt, as is known in the art, may be generated by reacting a primary amine, a nitrite and an acid. The nitrite may be any metal nitrite, preferably lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Preferred acids include nitric acid, $HNO_3$, hydrochloric acid, HCl, and sulfuric acid, $H_2SO_4$.

The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt.

Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4/NaNO_2$ or $HNO_3/NaNO_2$ are also relatively non-corrosive.

In general, generating a diazonium salt from a primary amine, a nitrite, and an acid requires two equivalents of acid based on the amount of amine used. In an in situ process, the diazonium salt can be generated using one equivalent of the acid. When the primary amine contains a strong acid group, adding a separate acid may not be necessary. The acid group or groups of the primary amine can supply one or both of the needed equivalents of acid. When the primary amine contains a strong acid group, preferably either no additional acid or up to one equivalent of additional acid is added to a process of the invention to generate the diazonium salt in situ. A slight excess of additional acid may be used. One example of such a primary amine is para-aminobenzenesulfonic acid (sulfanilic acid).

In general, diazonium salts are thermally unstable. They are typically prepared in solution at low temperatures, such as 0°–5° C., and used without isolation of the salt. Heating solutions of some diazonium salts may liberate nitrogen and form either the corresponding alcohols in acidic media or the organic free radicals in basic media.

However, the diazonium salt need only be sufficiently stable to allow reaction with the carbon black. Thus, the processes can be carried out with some diazonium salts otherwise considered to be unstable and subject to decomposition. Some decomposition processes may compete with the reaction between the carbon black and the diazonium salt and may reduce the total number of organic groups attached to the carbon black. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

Reagents can be added to form the diazonium salt in situ, to a suspension of carbon black in the reaction medium, for example, water. Thus, a carbon black suspension to be used may already contain one or more reagents to generate the diazonium salt and the process accomplished by adding the remaining reagents.

Reactions to form a diazonium salt are compatible with a large variety of functional groups commonly found on organic compounds. Thus, only the availability of a diazonium salt for reaction with a carbon black limits the processes of the invention.

The processes can be carried out in any reaction medium which allows the reaction between the diazonium salt and the carbon black to proceed. Preferably, the reaction medium is a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The processes are preferably carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

The reaction between a diazonium salt and a carbon black can take place with any type of carbon black, for example, in fluffy or pelleted form. In one embodiment designed to reduce production costs, the reaction occurs during a process for forming carbon black pellets. For example, a carbon black product of the invention can be prepared in a dry drum by spraying a solution or slurry of a diazonium salt onto a carbon black. Alternatively, the carbon black product can be prepared by pelletizing a carbon black in the presence of a solvent system, such as water, containing the diazonium salt or the reagents to generate the diazonium salt in situ. Aqueous solvent systems are preferred. Accordingly, another embodiment provides a process for forming a pelletized carbon black comprising the steps of: introducing a carbon black and an aqueous slurry or solution of a diazonium salt into a pelletizer, reacting the diazonium salt with the carbon black to attach an organic group to the carbon black, and pelletizing the resulting carbon black having an attached organic group. The pelletized carbon black product may then be dried using conventional techniques.

In general, the processes produce inorganic by-products, such as salts. In some end uses, such as those discussed below, these by-products may be undesirable. Several possible ways to produce a carbon black product without unwanted inorganic by-products or salts are as follows:

First, the diazonium salt can be purified before use by removing the unwanted inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art.

In addition to the inorganic by-products, a process may also produce organic by-products. They can be removed, for example, by extraction with organic solvents. Other ways of obtaining products without unwanted organic by-products may be known to those of skill in the art and include washing or removal of ions by reverse osmosis.

The reaction between a diazonium salt and a carbon black forms a carbon black product having an organic group attached to the carbon black. The diazonium salt may contain the organic group to be attached to the carbon black. It may be possible to produce the carbon black products of this invention by other means known to those skilled in the art.

The organic group may be an aliphatic group, a cyclic organic group, or an organic compound having an aliphatic portion and a cyclic portion. As discussed above, the diazonium salt employed in the processes can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hindrance of a substituted organic group increases, the number of organic groups attached to the carbon black from the reaction between the diazonium salt and the carbon black may be diminished.

When the organic group is substituted, it may contain any functional group compatible with the formation of a diazonium salt. Preferred functional groups include, but are not limited to, R, OR, COR, COOR, OCOR, carboxylate salts such as COOLi, COONa, COOK, $COO^-NR_4^+$, halogen, CN, $NR_2$, $SO_3H$, sulfonate salts such as $SO_3Li$, $SO_3Na$, $SO_3K$, $SO_3^-NR_4^+$, $OSO_3H$, $OSO_3^-$ salts, NR(COR), $CONR_2$, $NO_2$, $PO_3H_2$, phosphonate salts such as $PO_3HNa$ and $PO_3Na_2$, phosphate salts such as $OPO_3HNa$ and $OPO_3Na_2$, N=NR, $NR_3^+X^-$, $PR_3^+X^-$, $S_kR$, $SSO_3H$, $SSO_3^-$ salts, $SO_2NRR'$, $SO_2SR$, SNRR', SNQ, $SO_2NQ$, $CO_2NQ$, S-(1,4-piperazinediyl)-SR, 2-(1,3-dithianyl) 2-(1,3-dithiolanyl), SOR, and $SO_2R$. R and R', which can be the same or different, are independently hydrogen, branched or unbranched $C_1$–$C_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl. The integer k ranges from 1–8 and preferably from 2–4. The anion $X^-$ is a halide or an anion derived from a mineral or organic acid. Q is $(CH_2)_w$, $(CH_2)_xO(CH_2)_z$, $(CH_2)_xNR(CH_2)_z$, or $(CH_2)_xS(CH_2)_z$, where w is an integer from 2 to 6 and x and z are integers from 1 to 6.

A preferred organic group is an aromatic group of the formula $A_yAr$—, which corresponds to a primary amine of the formula $A_yArNH_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent on the aromatic radical independently selected from a preferred functional group described above or A is a linear, branched or cyclic hydrocarbon radical (preferably containing 1 to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl. In the above formula, specific examples of R and R' are $NH_2$—$C_6H_4$—, $CH_2CH_2$—$C_6H_4$—$NH_2$, $CH_2$—$C_6H_4$—$NH_2$, and $C_6H_5$.

Another preferred set of organic groups which may be attached to the carbon black are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. Preferably, when it contains an ionizable group forming an anion, such an organic group has a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. Preferably, the aromatic group of the organic group is directly attached to the carbon black. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Examples of these acidic groups and their salts are discussed above. Most preferably, the organic group is a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof. A preferred substituted sulfophenyl group is hydroxysulfophenyl group or a salt thereof.

Specific organic groups having an ionizable functional group forming an anion (and their corresponding primary amines) are p-sulfophenyl (p-sulfanilic acid), 4-hydroxy-3-sulfophenyl (2-hydroxy-5-amino-benzenesulfonic acid), and 2-sulfoethyl (2-aminoethanesulfonic acid). Other organic groups having ionizable functional groups forming anions can also be used.

Amines represent examples of ionizable functional groups that form cationic groups. For example, amines may be protonated to form ammonium groups in acidic media. Preferably, an organic group having an amine substituent has a pKb of less than 5. Quaternary ammonium groups ($-NR_3^+$) and quaternary phosphonium groups ($-PR_3^+$) also represent examples of cationic groups. Preferably, the organic group contains an aromatic group such as a phenyl or a naphthyl group and a quaternary ammonium or a quaternary phosphonium group. The aromatic group is preferably directly attached to the carbon black. Quaternized cyclic amines, and even quaternized aromatic amines, can also be used as the organic group. Thus, N-substituted pyridinium compounds, such as N-methyl-pyridyl, can be used in this regard. Examples of organic groups include, but are not limited to, $(C_5H_4N)C_2H_5^+$, $C_6H_4(NC_5H_5)^+$, $C_6H_4COCH_2N(CH_3)_3^+$, $C_6H_4COCH_2(NC_5H_5)^+$, $(C_5H_4N)CH_3^+$, and $C_6H_4CH_2N(CH_3)_3^+$.

An advantage of the carbon black products having an attached organic group substituted with an ionic or an ionizable group is that the carbon black product may have increased water dispersability relative to the corresponding untreated carbon black. Water dispersability of a carbon black product increases with the number of organic groups attached to the carbon black having an ionizable group or the number of ionizable groups attached to a given organic group. Thus, increasing the number of ionizable groups associated with the carbon black product should increase its water dispersibility and permits control of the water dispersibility to a desired level. It can be noted that the water dispersibility of a carbon black product containing an amine as the organic group attached to the carbon black may be increased by acidifying the aqueous medium.

Because the water dispersibility of the carbon black products depends to some extent on charge stabilization, it is preferable that the ionic strength of the aqueous medium be less than 0.1 molar. More preferably, the ionic strength is less than 0.01 molar.

When such a water dispersible carbon black product is prepared, it is preferred that the ionic or ionizable groups be ionized in the reaction medium. The resulting product solution or slurry may be used as is or diluted prior to use.

Alternatively, the carbon black product may be dried by techniques used for conventional carbon blacks. These techniques include, but are not limited to, drying in ovens and rotary kilns. Overdrying, however, may cause a loss in the degree of water dispersibility.

In addition to their water dispersibility, carbon black products having an organic group substituted with an ionic or an ionizable group may also be dispersible in polar organic solvents such as dimethylsulfoxide (DMSO), and formamide. In alcohols such as methanol or ethanol, use of complexing agents such as crown ethers increases the dispersibility of carbon black products having an organic group containing a metal salt of an acidic group.

Aromatic sulfides encompass another group of preferred organic groups. Carbon black products having aromatic sulfide groups are particularly useful in rubber compositions. These aromatic sulfides can be represented by the formulas $Ar(CH_2)_qS_k(CH_2)_rAr'$ or $A-(CH_2)_qS_k(CH_2)_rAr''$ wherein Ar and Ar' are independently substituted or unsubstituted arylene or heteroarylene groups, Ar'' is an aryl or heteroaryl group, k is 1 to 8 and q and r are 0–4. Substituted aryl groups would include substituted alkylaryl groups. Preferred arylene groups include phenylene groups, particularly p-phenylene groups, or benzothiazolylene groups. Preferred aryl groups include phenyl, naphthyl and benzothiazolyl. The number of sulfurs present, defined by k preferably ranges from 2 to 4. Preferred carbon black products are those having an attached aromatic sulfide organic group of the formula $-(C_6H_4)-S_k-(C_6H_4)-$, where k is an integer from 1 to 8, and more preferably where k ranges from 2 to 4. Particularly preferred aromatic sulfide groups are bis-para-$(C_6H_4)-S_2-(C_6H_4)-$ and para-$(C_6H_4)-S_2-(C_6H_5)$. The diazonium salts of these aromatic sulfide groups may be conveniently prepared from their corresponding primary amines, $H_2N-Ar-S_k-Ar'-NH_2$ or $H_2N-Ar-S_k-Ar''$. Preferred groups include dithiodi-4,1-phenylene, tetrathiodi-4,1-phenylene, phenyldithiophenylene, dithiodi-4,1-(3-chlorophenylene), -(4-$C_6H_4$)—S—S-(2-$C_7H_4$NS), -(4-$C_6H_4$)—S—S-(4-$C_6H_4$)—OH, -6-(2-$C_7H_3$NS)—SH, -(4-$C_6H_4$)—$CH_2CH_2$—S—S—$CH_2CH_2$-(4-$C_6H_4$)—, -(4-$C_6H_4$)—$CH_2CH_2$—S—S—S—$CH_2CH_2$-(4-$C_6H_4$)—, -(2-$C_6H_4$)—S—S-(2-$C_6H_4$)—, -(3-$C_6H_4$)—S—S-(3-$C_6H_4$)—, -6-($C_6H_3N_2$S), -6-(2-$C_7H_3$NS)—S—NRR' where RR' is —$CH_2CH_2OCH_2CH_2$—, -(4-$C_6H_4$)—S—S—S—S-(4-$C_6H_4$)—, -(4-$C_6H_4$)—CH=$CH_2$, -(4-$C_6H_4$)—S—$SO_3$H, -(4-$C_6H_4$)—$SO_2$NH-(4-$C_6H_4$)—S—S-(4-$C_6H_4$)—$NHSO_2$-(4-$C_6H_4$)—, -6-(2-$C_7H_3$NS)—S—S-2-(6-$C_7H_3$NS)—, -(4-$C_6H_4$)—S—$CH_2$-(4-$C_6H_4$)—, -(4-$C_6H_4$)—$SO_2$—S-(4-$C_6H_4$)—, -(4-$C_6H_4$)—$CH_2$—S—$CH_2$-(4-$C_6H_4$)—, -(3-$C_6H_4$)—$CH_2$—S—$CH_2$-(3-$C_6H_4$)—, -(4-$C_6H_4$)—$CH_2$—S—S—$CH_2$-(4-$C_6H_4$)—, -(3-$C_6H_4$)—$CH_2$—S—S—$CH_2$-(3-$C_6H_4$)—, -(4-$C_6H_4$)—S—NRR' where RR' is —$CH_2CH_2OCH_2CH_2$—, -(4-$C_6H_4$)—$SO_2$NH—$CH_2CH_2$13 S—S—$CH_2CH_2$—$NHSO_2$-(4-$C_6H_4$)—, -(4-$C_6H_4$)-2-(1,3-dithianyl;); and -(4-$C_6H_4$)—S-(1,4-piperizinediyl)-S-(4-$C_6$-$H_4$)—.

Another preferred set of organic groups which may be attached to the carbon black are organic groups having an aminophenyl, such as $(C_6H_4)-NH_2$, $(C_6H_4)-CH_2-(C_6H_4)-NH_2$, $(C_6H_4)-SO_2-(C_6H_4)-NH_2$. Preferred organic groups also include aromatic sulfides, represented by the formulas $Ar-S_n-Ar'$ or $Ar-S_n-Ar''$, wherein Ar and Ar' are independently arylene groups, Ar'' is an aryl and n is 1 to 8. Methods for attaching such organic groups to carbon black are discussed in U.S. Pat. Nos. 5,554,739 and 5,559,169; U.S. patent applications Ser. Nos. 08/356,660 and 08/572,525; and PCT Published Patent Applications Nos. WO 96/18688 and WO 96/18696, all of the disclosures of which are fully incorporated by reference herein.

As stated earlier, the silicon-treated carbon black may also be modified to have at least one organic group attached to the silicon-treated carbon black. Alternatively, a mixture of silicon-treated carbon black and a modified carbon black having at least one attached organic group may be used.

Furthermore, it is within the bounds of this application to also use a mixture of silica and silicon-treated carbon black. Also, any combination of additional components with the silicon-treated carbon black may be used such as one or more of the following:

a) silicon-treated carbon black with an attached organic group optionally treated with silane coupling agents;
b) modified carbon black having an attached organic group;
c) silica;
d) modified silica, for example, having an attached organic group, and/or
e) carbon black.

The term "silica" includes, but is not limited to, silica, precipitated silica, amorphous silica, vitreous silica, fumed silica, fused silica, silicates (e.g., alumino silicates) and other Si containing fillers such as clay, talc, wollastonite, etc. Silicas are commercially available from such sources as Cabot Corporation under the Cab-O-Sil® tradename; PPG Industries under the Hi-Sil and Ceptane tradenames; Rhone-Poulenc under the Zeosil tradename; and Degussa AG under the Ultrasil and Coupsil tradenames.

The elastomeric compounds of the present invention may be prepared from the treated carbon blacks by compounding with any elastomer including those useful for compounding a carbon black.

Any suitable elastomer may be compounded with the treated carbon blacks to provide the elastomeric compounds of the present invention. Such elastomers include, but are not limited to, homo- or co-polymers of 1,3 butadiene, styrene, isoprene, isobutylene, 2,3-dimethyl-1,3-butadiene, acrylonitrile, ethylene, and propylene Preferably, the elastomer has a glass transition temperature (Tg) as measured by differential scanning colorimetry (DSC) ranging from about −120° C. to about 0° C. Examples include, but are not limited, styrene-butadiene rubber (SBR), natural rubber, polybutadiene, polyisoprene, and their oil-extended derivatives. Blends of any of the foregoing may also be used.

Among the rubbers suitable for use with the present invention are natural rubber and its derivatives such as chlorinated rubber. The silicon-treated carbon black products of the invention may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1.

The rubber compositions of the present invention can therefore contain an elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between −120° C. and 0° C. Examples of such elastomers include poly(butadiene), poly(styrene-co-butadiene), and poly(isoprene).

Elastomeric compositions disclosed in the present invention include, but are not limited to, vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

The aggregate of the present invention (i. e., the silicon-treated carbon black) can be present in an elastomer in an amount of from about 10 to about 300 parts per hundred parts of elastomer, more preferably from about 100 to about 200 parts per hundred parts of elastomer, even more preferably from about 10 to about 150 parts per hundred parts of elastomer and most preferably from about 20 to about 80 parts per hundred parts of elastomer.

The elastomeric compositions may include one or more curing agents such as, for example, sulfur, sulfur donors, activators, accelerators, peroxides, and other systems used to effect vulcanization of the elastomer composition.

The following examples illustrate the invention without limitation.

EXAMPLES

Example 1

Silicon-treated carbon blacks according to the present invention were prepared using a pilot scale reactor generally as described above, and as depicted in FIG. 1 and having the dimensions set forth below: $D_1$=4 inches, $D_2$=2 inches, $D_3$=5 inches, $L_1$=4 inches, $L_2$=5 inches, $L_3$=7 inches, $L_4$=1 foot and Q=4.5 feet. The reaction conditions set forth in Table 1 below, were employed.

These conditions result in the formation of a carbon black identified by the ASTM designation N234. A commercially available example of N234 is Vulcan® 7H from Cabot Corporation, Boston, Mass. These conditions were altered by adding a volatizable silicon-containing compound into the reactor, to obtain a silicon-treated carbon black. The flow rate of the volatizable compound was adjusted to alter the weight percent of silicon in the treated carbon black. The weight percent of silicon in the treated carbon black was determined by the ashing test, conducted according to ASTM procedure D-1506.

One such new treated carbon black was made by injecting an organo-silicon compound, namely octamethyl-cyclotetrasiloxane (OMTS), into the hydrocarbon feedstock. This compound is sold as "D4" by Dow Corning Corporation, Midland, Mich. The resultant silicon-treated carbon black is identified herein as OMTS-CB. A different silicon-treated carbon black (TEOS-CB) was prepared by introducing a second silicon-containing volatizable compound, tetraethoxy silane, (sold as TEOS, by Huls America, Piscataway, N.J.), into the hydrocarbon feedstock.

Since changes in reactor temperature are known to alter the surface area of the carbon black, and reactor temperature is very sensitive to the total flow rate of the feedstock in the injection zone (zone 3 in FIG. 1), the feedstock flow rate was adjusted downward to approximately compensate for the introduction of the volatizable silicon-containing compound, such that a constant reactor temperature was maintained. This results in an approximately constant external surface area (as measured by t-area) for the resultant carbon blacks. All other conditions were maintained as necessary for manufacturing N234 carbon black. A structure control additive (potassium acetate solution) was injected into the feedstock to maintain the specification structure of the N234 carbon black. The flow rate of this additive was maintained constant in making the silicon-treated carbon blacks described throughout the following examples.

The external surface area (t-area) was measured following the sample preparation and measurement procedure described in ASTM D3037-Method A for Nitrogen surface area. For this measurement, the nitrogen adsorption isotherm was extended up to 0.55 relative pressure. The relative pressure is the pressure (P) divided by the saturation pressure ($P_0$) (the pressure at which the nitrogen condenses). The adsorption layer thickness ($t_1$) was then calculated using the relation:

$$t_1 = \frac{13.99}{\sqrt{0.034 - \log(P/P_0)]}}$$

The volume (V) of nitrogen adsorbed was then plotted against $t_1$. A straight line was then fitted through the data points for $t_1$ values between 3.9 and 6.2 Angstroms. The t-area was then obtained from the slope of this line as follows:

$t$-area, $m^2/gm = 15.47 \times$ slope

TABLE 1

| Conditions | Carbon Black | | |
|---|---|---|---|
| | N234 | TEOS-CB | OMTS-CB |
| Air Rate, kscfh | 12.8 | 12.8 | 12.8 |
| Gas Rate, kscfh | 0.94 | 0.94 | 0.94 |
| feedstock rate, lbs/hr | 166 | 139 | 155 |
| Si compound rate, lbs/hr | 0 | 16 | 5 |

The resultant carbon blacks were analyzed for surface area and silicon content. These values are set forth in Table 2 below:

TABLE 2

| Properties | Carbon Black | | |
|---|---|---|---|
| | N234 | TEOS-CB | OMTS-CB |
| % Silicon in Carbon Black | 0.02 | 2.85 | 2.08 |
| DBP, cc/100 g | 125.0 | 114.0 | 115.0 |
| CDBP, cc/100 g | 101.5 | 104.1 | 103.5 |
| t-Area, $m^2/g$ | 117.0 | 121.0 | 121.0 |
| $N_2$ area, $m^2/g$ | 120.4 | 136.0 | 133.0 |

Example 2

A scanning transmission electron microscope (STEM) coupled to an energy dispersive X-ray analyzer, was used to further characterize the silicon-treated carbon black. The following Table 3 compares N234, OMTS-CB (prepared according to Example 1) and N234 to which 3.7% by weight silica (L90, sold as CAB-O-SIL® L90, by Cabot Corporation, Boston, Mass.) was added to form a mixture. As described below, the STEM system may be used to examine an individual aggregate of carbon black for elemental composition. A physical mixture of carbon black and silica will result in the identification of silica aggregates which show mostly silicon signal and little or background carbon signal. Thus, when multiple aggregates are examined in a mixture, some of the aggregates will show a high Si/C signal ratio, corresponding to aggregates of silica.

Five mg of carbon black was dispersed into 20 mL of chloroform and subjected to ultrasonic energy using a probe sonicator (W-385 Heat Systems Ultra Sonicator). A 2 mL aliquot was then dispersed into 15 mL of chloroform using a probe sonicator for three minutes. The resulting dispersion was placed on a 200 mesh nickel grid with aluminum substrate. The grid was then placed under a Fisons HB501 Scanning Transmission Electron Microscope (Fisons, West Sussex, England) equipped with an Oxford Link AN 10000 Energy Dispersive X-ray Analyzer (Oxford Link, Concord, Mass.).

Initially the grid was scanned for potential silica aggregates at low magnification (less than 200,000×). This was done by searching for aggregates that had a Si/C count ratio greater than unity. After this initial scan, typically thirty aggregates were selected for detailed analysis at higher magnification (from between 200,000× and 2,000,000×). The selected aggregates included all of the aggregates which contained Si/C count ratios greater than unity, as identified by the initial scan. The highest ratios of Si/C counts thus determined are set forth in Table 3 for N234, OMTS-CB and a mixture of N234 and silica.

TABLE 3

| Ratio of Si/C Signal Measured with STEM | | |
|---|---|---|
| | % Si in Modified Sample | Highest Ratio of Si/C Counts per Aggregate |
| N234 | 0 | 0.02 |
| OMTS-CB | 3.28 | 0.27 |
| N234 + 3.7% silica (L90) | 1.7 | 49 |

Thus, a well dispersed mixture of carbon black and silica having the same silicon content as the OMTS-CB shows 180 times higher peak Si/C counts. This data shows that the OMTS-CB carbon black is not a simple physical mixture of silica and carbon black, but rather that the silicon is a part of the intrinsic chemical nature of the carbon black.

Example 3

HF Treatment

Hydrofluoric acid (HF) is able to dissolve silicon compounds but does not react with carbon. Thus, if either a conventional (untreated) carbon black or a mixture of silica and carbon black is treated with HF, the surface and surface area of the carbon black will remain unchanged, because it is unaffected by the dissolution of the silicon compounds removed from the mixture. However, if silicon containing species are distributed throughout at least a portion, including the surface, of the carbon black aggregate, the surface area will markedly increase as micropores are formed as the silicon compound is dissolved out of the carbon black structure.

Five grams of the carbon black to be tested were extracted with 100 mL of 10% v/v hydrofluoric acid for 1 hour. The silicon content and nitrogen surface area were measured before and after the HF treatment. The results are shown in Table 4.

TABLE 4

| | HF Treatment | | | |
|---|---|---|---|---|
| | % Si Before HF Treatment | % Si After HF Treatment | $N_2SA$ Before HF Treatment | $N_2SA$ After HF Treatment |
| N234 | 0.02 | 0.05 | 123 | 123 |
| OMTS-CB | 3.3 | 0.3 | 138 | 180 |

Photomicrographs were taken of the carbon black samples before and after HF treatment. The photomicrographs are shown in FIGS. 4a–4d. These photographs show that the silicon-treated carbon blacks have a rougher surface, consistent with increased microporosity after the HF treatment, compared to the untreated carbon black.

Example 3A

Another silicon-treated carbon black was made by injecting TEOS into the reaction zone of the reactor immediately (one foot) downstream from the hydrocarbon feedstock injection plane, as indicated at injection point 12 in FIG. 1. All other reaction conditions were maintained as required for manufacturing N234 black, as described in Example 1. The TEOS flow rate was adjusted to 17.6 lbs per hour.

The resultant black was analyzed for silicon content and surface area, before and after HF extraction as described in Example 3. The results are described in Table 4A.

TABLE 4A

| TEOS-CB' - manufactured by injection of TEOS into reaction zone | | |
|---|---|---|
| | % Si | $N_2$ Area |
| Before HF | 2.27 | 127.7 |
| After HF | 0.04 | 125.8 |

Thus, no increase in $N_2$ surface area was seen after HF extraction of the TEOS-CB'. Analysis of the aggregates by the STEM procedure described in Example 2 also showed silicon to be present in the aggregates and not as independent silica entities. These results show that in this case the silicon-containing species of the silicon-treated carbon blacks are primarily located near the surface.

Example 4
Preparation of Elastomeric Compositions

The carbon blacks of the previous Examples were used to make elastomeric compounds. Elastomeric compositions incorporating the silicon-treated carbon blacks discussed above, were prepared using the following elastomers: solution SBR (Duradene 715 and Cariflex S-1215, from Firestone Synthetic Rubber & Latex Co., Akron, Ohio), functionalized solution SBR (NS 114 and NS 116 from Nippon Zeon Co., SL 574 and TO589 from Japan Synthetic Rubber Co.), emulsion SBR (SBR 1500, from Copolymer Rubber & Chemicals, Corp., Baton Rouge, La.), and natural rubber (SMR5, from Malaysia).

The elastomeric compositions were prepared according to the following formulation:

TABLE 5

| Ingredient | Parts by weight |
|---|---|
| elastomer | 100 |
| carbon black | 50 |
| zinc oxide | 3 |
| stearic acid | 2 |
| Flexzone 7P ® | 1 |
| Durax ® | 1.25 |
| Captax ® | 0.2 |
| sulfur | 1.75 |
| Si-69 (optional) | 3 or 4 |

Flexzone 7P®, N-(1,3-dimethyl butyl)-N'-phenyl-p-phenylene diamine, is an anti-oxidant available from Uniroyal Chemical Co., Middlebury, Conn. Durax®, N-cyclohexane-2-benzothiazole sulphenamide, is an accelerator available from R. T. Vanderbilt Co., of Norwalk, Conn, and Captax®, 2-mercaptobenzothiazole, is an accelerator available from R. T. Vanderbilt Co.

The elastomeric compounds were prepared using a two-stage mixing procedure. The internal mixer used for preparing the compounds was a Plasti-Corder EPL-V (obtained from C. W. Brabender, South Hackensack, N.J.) equipped with a cam-type mixing head (capacity 600 mL). In the first stage, the mixer was set at 80° C., and the rotor speed was set at 60 rpm. After the mixer was conditioned to 100° C. by heating the chamber with a dummy mixture, the elastomer was loaded and masticated for 1 minute. Carbon black, pre-blended with zinc oxide (obtained from New Jersey Zinc Co., New Jersey), and optionally a coupling agent, was then added. After three minutes, stearic acid (obtained from Emery Chemicals, Cincinnati, Ohio) and anti-oxidant were added. Mixing was continued for an additional two minutes. The stage 1 masterbatch was then dumped from the mixer at five minutes total. This was then passed through an open mill (four inch, two-roll mill, obtained from C. W. Brabender, South Hackensack, N.J.) three times and stored at room temperature for two hours.

In the second stage, the mixing chamber temperature was set to 80° C. and the rotor speed was set to 35 rpm. After the mixer was conditioned the masterbatch from stage one was loaded and mixed for one minute. The curative package (including sulfur, Durax and Captax) was then added. The material was dumped from the mixer at two minutes and passed through the open mill three times.

Batches of the compounds were prepared as described for the carbon blacks in the previous Examples. The same grade of conventional carbon black was used as a control. For each carbon black, two batches were prepared. The first batch was made using Si-69 as the coupling agent. The second batch was made without a coupling agent. After mixing, each of the elastomeric compositions was cured at 145° C. to an optimum cure state according to measurements made with a Monsanto ODR Rheometer.

Elastomeric compounds employing the elastomers set forth in Table 1A may be formulated by following the foregoing procedure.

Example 5
Bound Rubber Test

The bound rubber content of an elastomeric compound incorporating carbon black can be taken as a measure of the surface activity of the carbon black. The higher the bound rubber content, the higher the surface activity of the carbon black.

Bound rubber was determined by extraction of an elastomeric compound with toluene at room temperature. The bound rubber is the elastomer remaining after extraction by the solvent. The elastomer used was solution SBR (SSBR) Duradene 715 without a coupling agent, as described above in Example 4.

Figure 2:
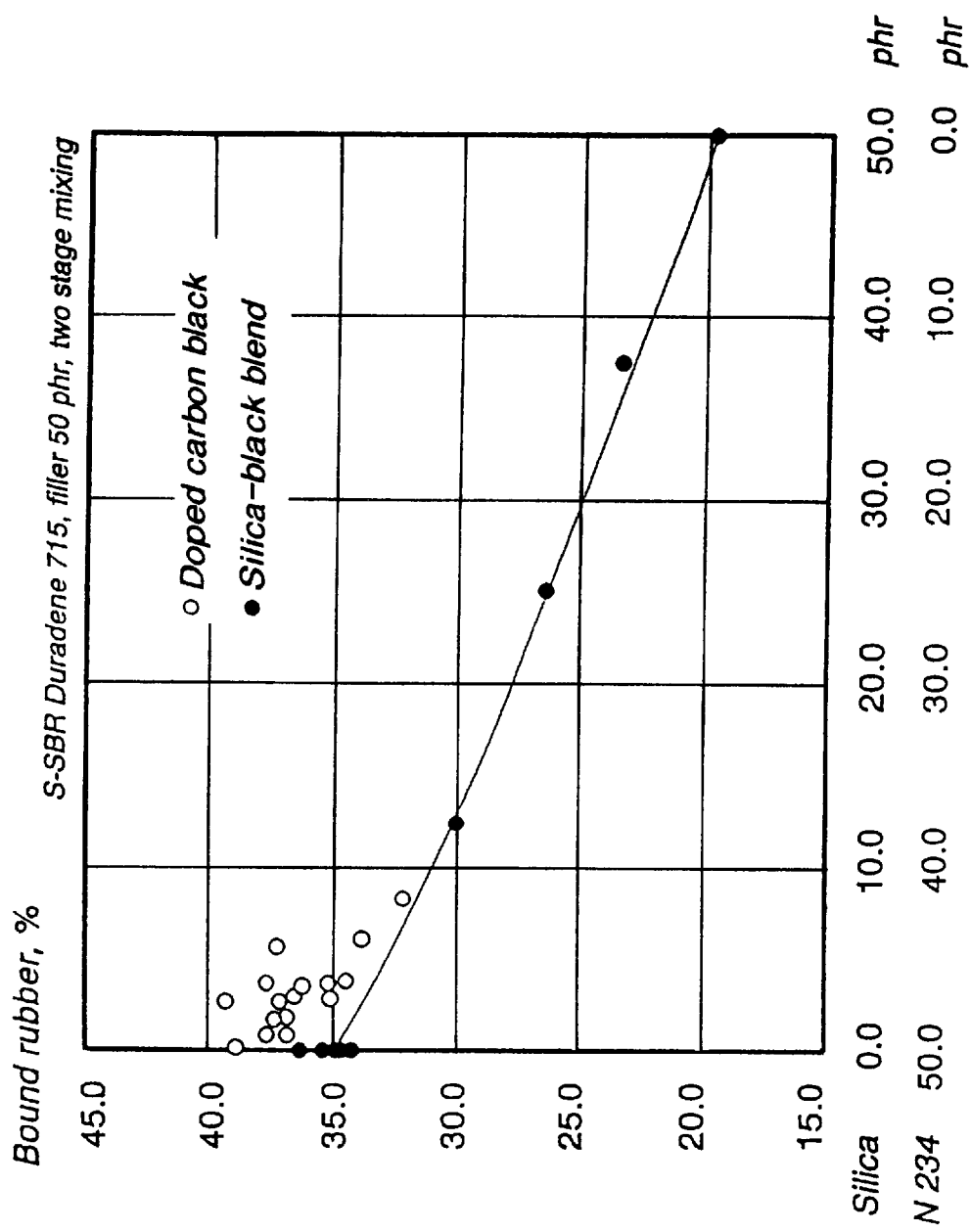
FIG. 2 is a graph demonstrating the results of a bound rubber test carried out on elastomeric compositions of the present invention.

As seen in FIG. 2, the bound rubber was determined for a series of blends of silica and carbon black, which serve as a reference against which to compare the bound rubber of the silicon-treated carbon black. The results of the bound rubber measurements for the two sets of compounds are plotted against their equivalent silica content in FIG. 2. For the treated carbon blacks, the equivalent silica content is a theoretical value calculated from the total silicon as measured by ashing. It is seen that silicon-treated carbon blacks yield a higher bound rubber than their conventional counterparts. This suggests that the treated carbon black surface is relatively more active. Moreover, as shown in FIG. 2, the bound rubber content of treated carbon black-filled compounds lie well above the reference line generated from the blends of carbon black and silica. This confirms that the treated carbon black is not a physical mixture of silica and carbon black.

Example 6
Dynamic Hysteresis and Abrasion Resistance

The dynamic hysteresis and abrasion resistance rates were measured for the elastomeric compositions produced according to Example 4 above.

Figure 3A:
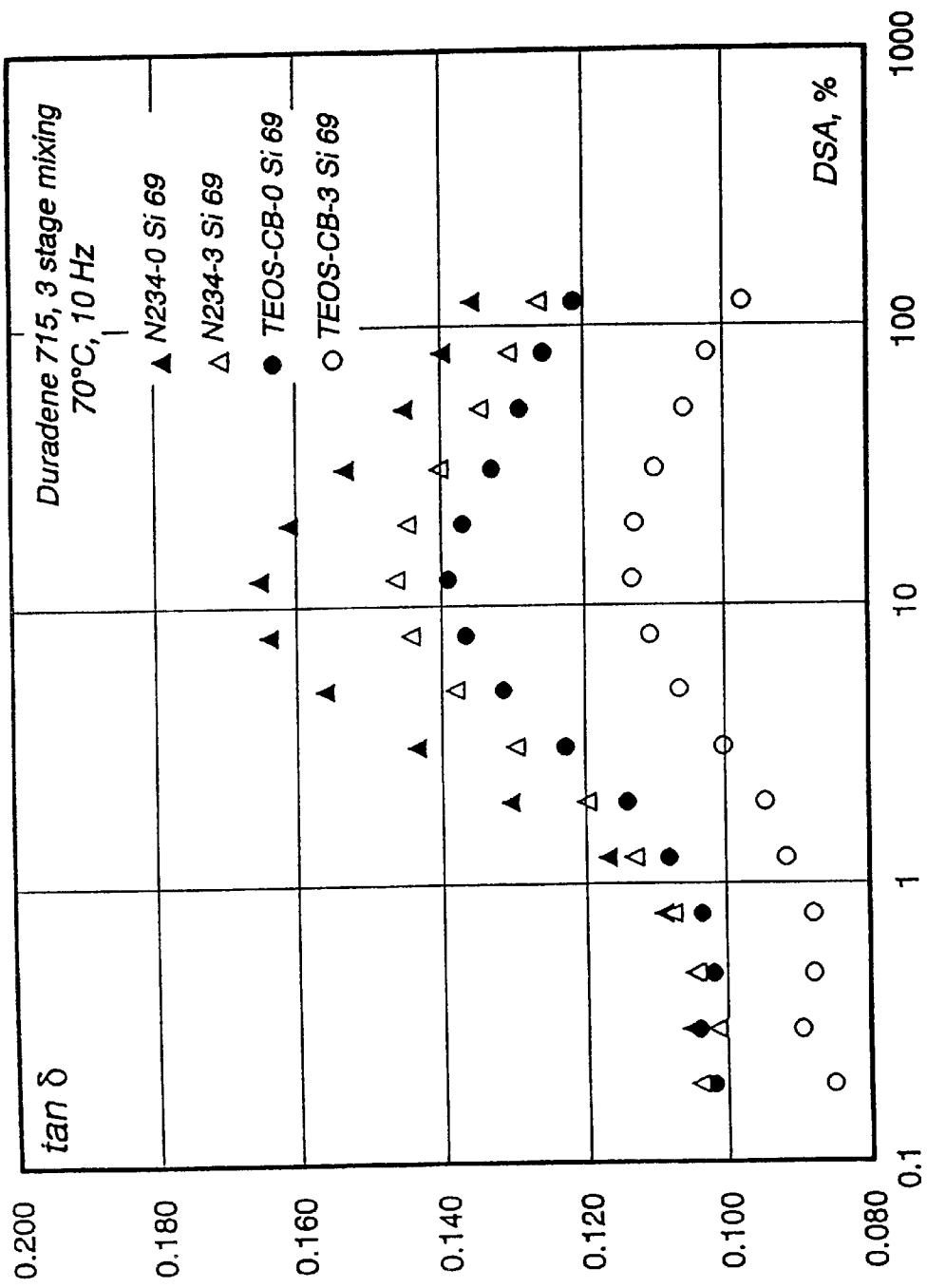
FIGS. 3a, 3b and 3c are graphs demonstrating hysteresis values measured at different temperatures and strains on elastomeric compositions of the present invention.
Figure 3B:
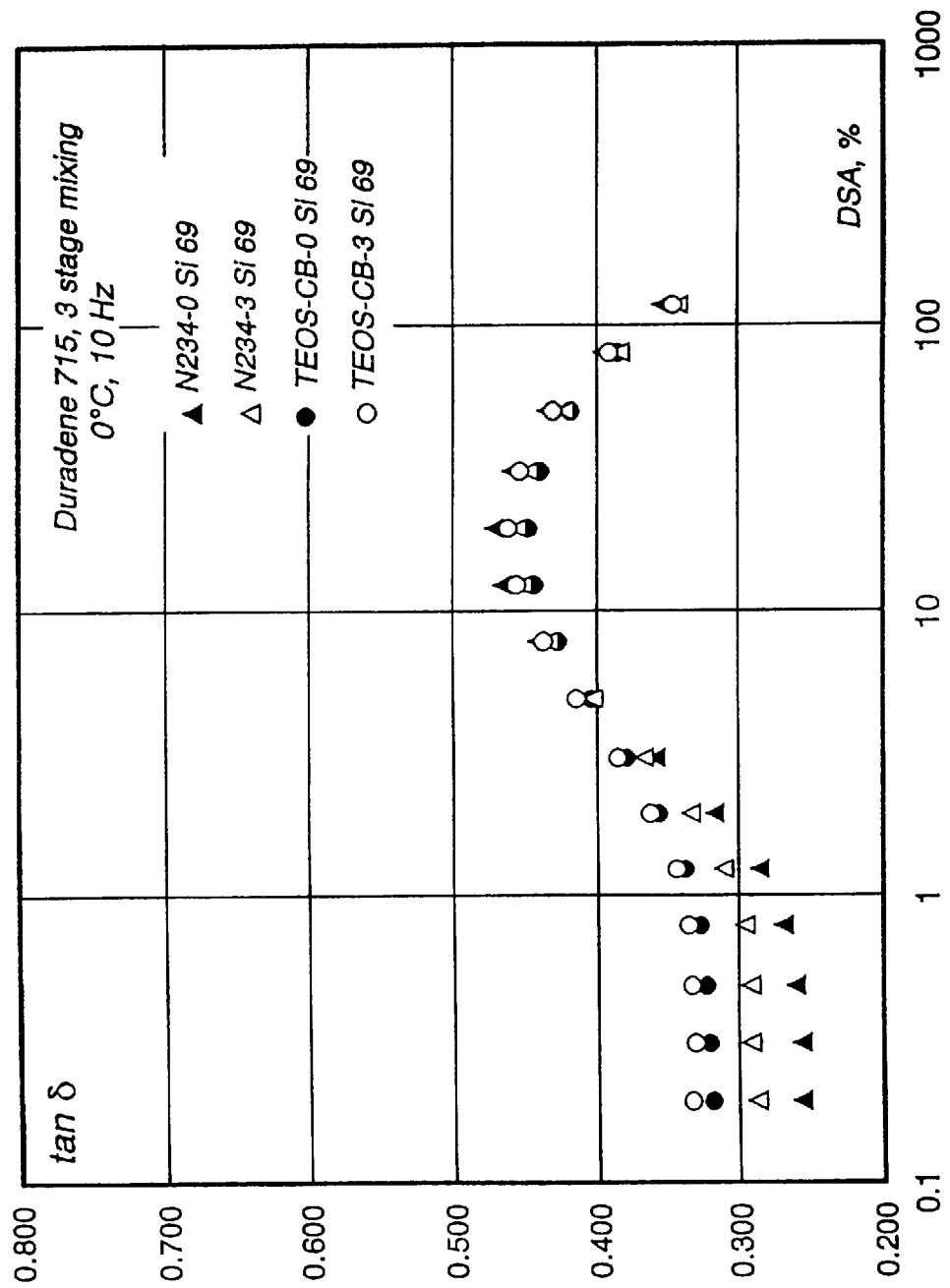
Figure 3C:
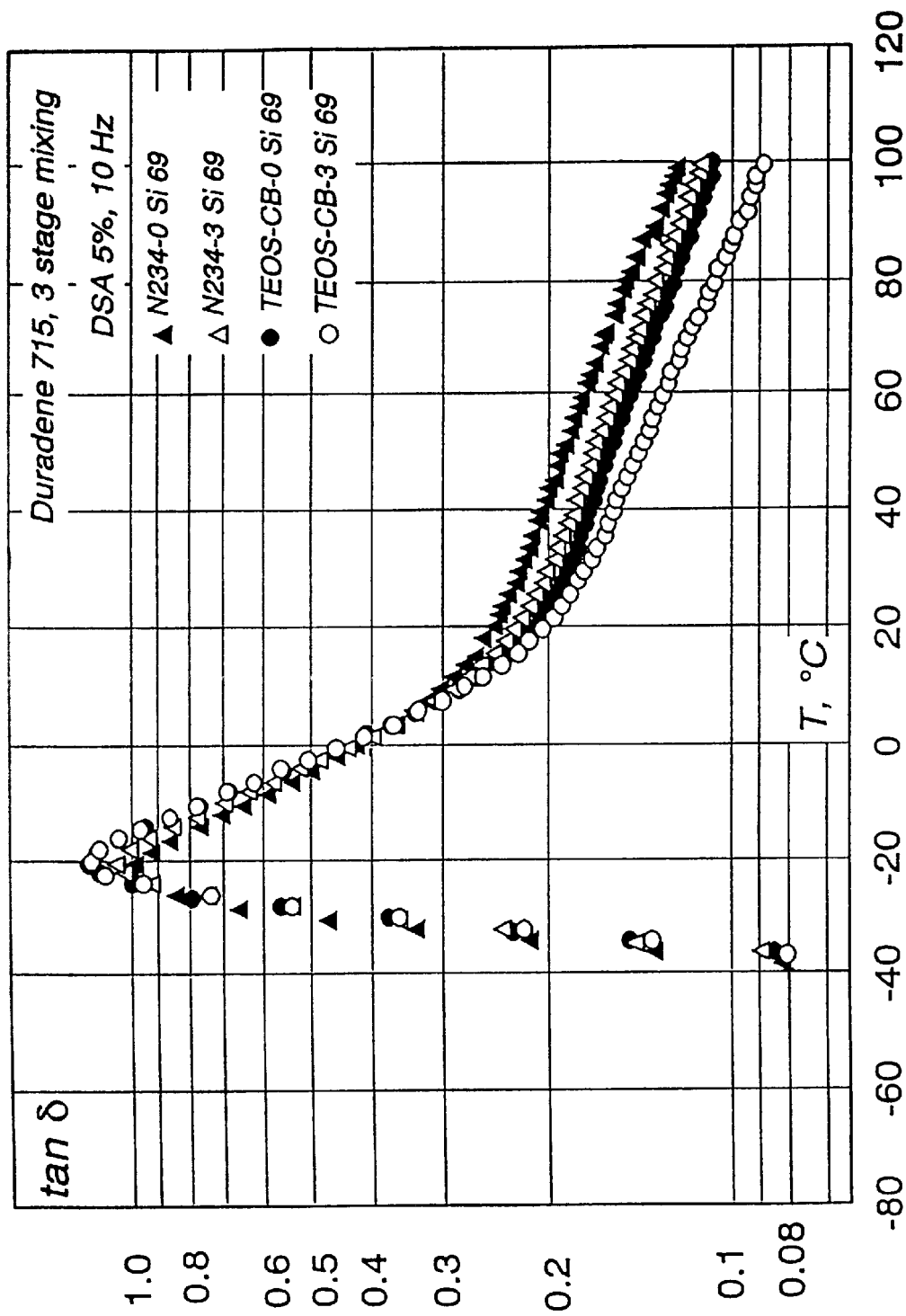
Figure 4A:
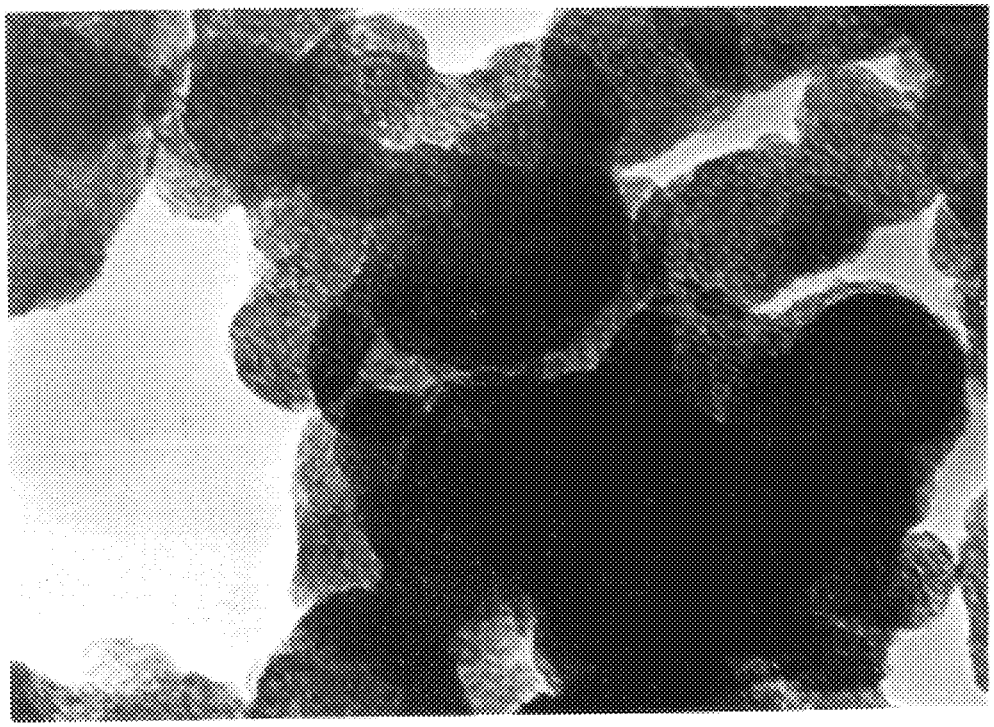
FIGS. 4a–4d are photomicrographs comparing carbon blacks useful in the present invention and prior art carbon blacks.
Figure 4B:
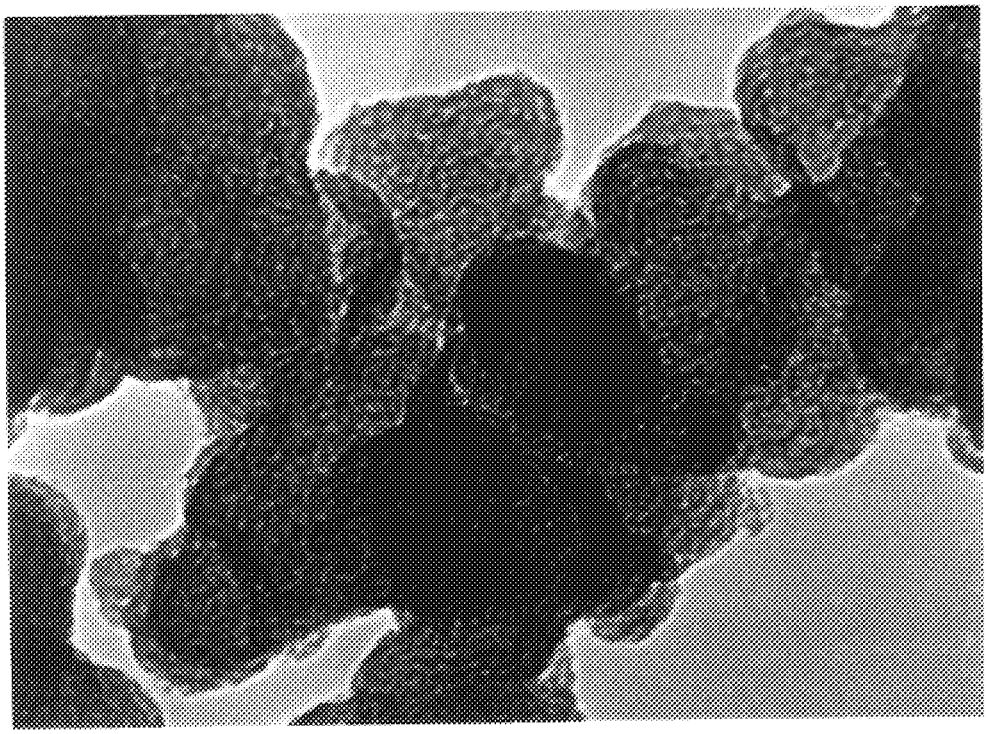
Figure 4C:
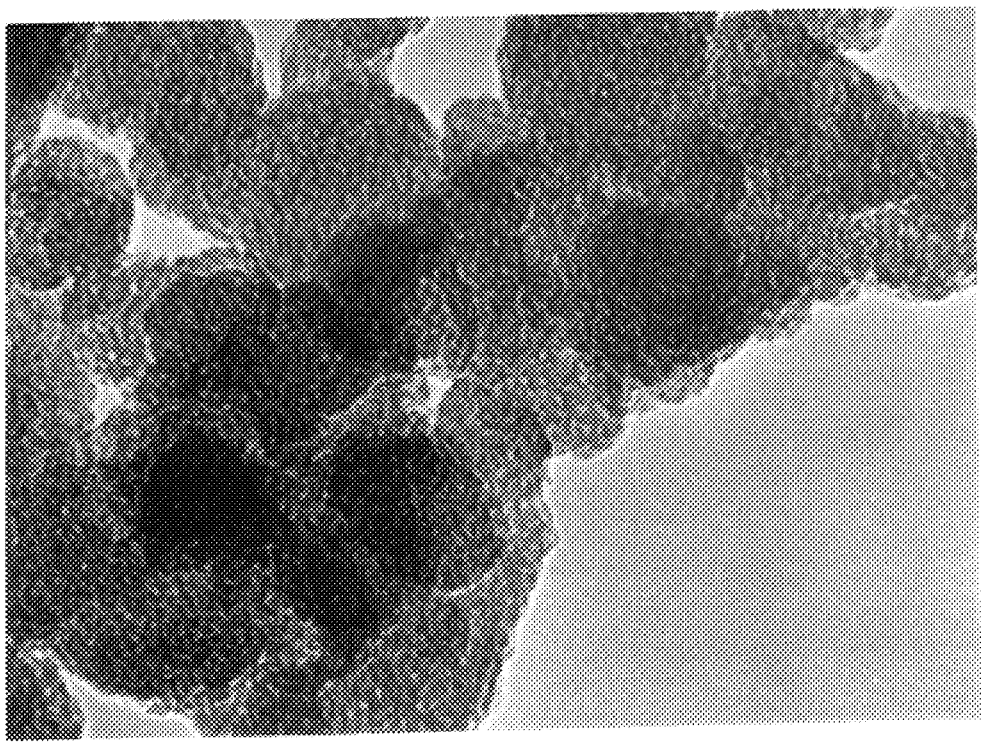
Figure 4D:
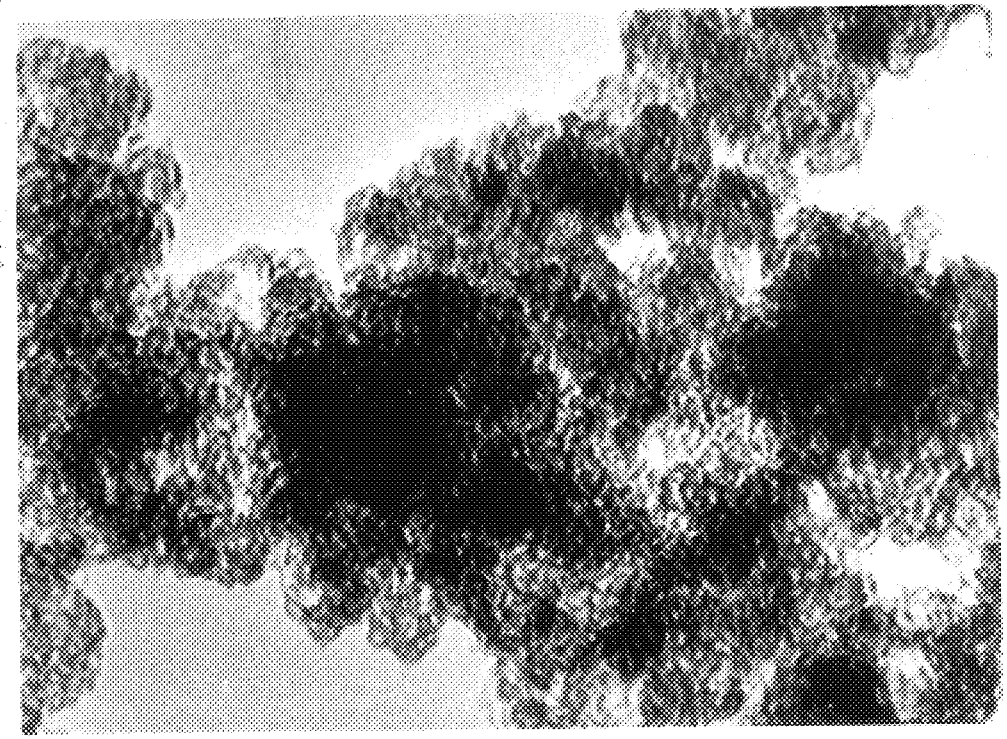

Abrasion resistance was determined using an abrader, which is based on a Lambourn-type machine as described in U.S. Pat. No. 4,995,197, hereby incorporated by reference. The tests were carried out at 14% slip. The percentage slip is determined based on the relative velocities of a sample wheel and a grindstone wheel. The abrasion resistance index is calculated from the mass loss of the elastomeric compound. Dynamic properties were determined using a Rheometrics Dynamic Spectrometer II (RDS II, Rheometrics, Inc., N.J.) with strain sweep. The measurements were made at 0 and 70° C. with strain sweeps over a range of double strain amplitude (DSA) from 0.2 to 120%. The maximum tan δ values on the strain sweep curves were taken for comparing the hysteresis among elastomeric compounds as can be seen in FIGS. 3a and 3b. Alternatively, hysteresis measurements were made by means of temperature sweeps at a DSA of 5% and a frequency of 10 Hz. The temperature range was from −60° C. to 100° C., as seen in FIG. 3c.

TABLE 6

Dynamic Hysteresis Data

| SSBR Composition[a] | Si-69 | tan δ at 0° C. | tan δ at 70° C. | abrasion at 14% slip |
|---|---|---|---|---|
| N234 | 0 | 0.400 | 0.189 | 100 |
| N234 | 3 | 0.429 | 0.170 | 103.5 |
| OMTS-CB | 0 | 0.391 | 0.175 | 84.4 |
| OMTS-CB | 3 | 0.435 | 0.152 | 110.5 |
| TEOS-CB | 0 | 0.400 | 0.167 | 78.1 |
| TEOS-CB | 3 | 0.433 | 0.142 | 97.2 |

[a]Duradene 715; two stage mixing.

As seen in Table 6 above, tan δ at 70° C. values were reduced by 7%, tan δ at 0° C. values reduced by 2.3% and the wear resistance was reduced by 15%, for the SSBR samples when OMTS-CB was substituted for N234. However, when the Si-69 coupling agent was incorporated into the composition, the wear resistance for the OMTS-CB sample improved to 110% of the value for N234. The tan δ at 70° C. values decreased by 19.6% compared to N234 without coupling agent and 10.5% compared to N234 with coupling agent. The tan δ at 0° C. values increased by 11% when the coupling agent was added to the OMTS-CB, compared to OMTS-CB without coupling agent. Similarly, for TEOS-CB, the tan δ at 70° C. value is reduced by 11.6%, the tan δ at 0° C. value is unchanged and the wear is reduced by 21.9%. When compounded with the coupling agent, the tan δ at 70° C. value is reduced by 24.9%, the tan δ at 0° C. value is increased by 8.3% and the wear decreased by only 2.8%.

It was determined that employing the treated carbon blacks and an elastomer in an elastomeric composition of the present invention generally resulted in poor abrasion resistance, compared to an elastomeric composition including the same elastomer and N234 carbon black. However, as seen in Table 6, when Si-69 coupling agent was incorporated into the composition, abrasion resistance returned to approximately the same values as obtained with untreated carbon black.

As used herein, "untreated carbon black" means a carbon black prepared by a process similar to that used to prepare the corresponding treated black, but without the volatizable silicon compound and by making suitable adjustments to the process conditions to achieve a carbon black with an external surface area approximately equal to that of the treated black.

Example 6A

The dynamic hysteresis and abrasion properties of a black made by following the procedure of Example 3A (and containing 1.91% Si) were measured as in Example 6. As seen in Table 6A below, tan δ at 70° C. values were reduced by 14%, tan δ at 0° C. values were reduced by 6% and the wear resistance was reduced by 22%, for the SSBR samples when TEOS-CB was substituted for N234. However, when Si69 coupling agent was incorporated into the composition, the wear resistance for the TEOS-CB sample improved to 108% of the value for N234. The tan δ at 70° C. values decreased by 18% compared to N234 without coupling agent and 7% compared to N234 with coupling agent. The tan δ at 0° C. values decreased by only 1.5% when the coupling agent was added to TEOS-CB, compared to N234 with coupling agent.

TABLE 6A

Dynamic Hysteresis Data

| SSBR Composition[a] | Si 69 | tan δ @0° C. | tan δ @70° C. | Abrasion @ 14% Slip |
|---|---|---|---|---|
| N234 | 0 | 0.428 | 0.184 | 100 |
| N234 | 4 | 0.394 | 0.162 | 94 |
| TEOS-CB | 0 | 0.402 | 0.158 | 78 |
| TEOS-CB | 4 | 0.388 | 0.151 | 108 |

[a]Cariflex S-1215; two stage mixing

Example 7
Improvement in Hysteresis by Three Stage Compounding

The beneficial properties obtained using the treated carbon blacks with the elastomeric compounds of the present invention may be further enhanced by using an additional mixing stage during the compounding process. The procedure for two stage mixing used in the previous compounding examples, is described above in Example 4.

For three stage mixing, the stage 1 mixer was set at 80° C. and 60 rpm. After conditioning to 100° C. by heating the chamber with a dummy mixture, the elastomer was introduced to the mixer at 100° C. and masticated for one minute. The carbon black was added to the elastomer and mixing continued for an additional three minutes. In some cases, a coupling agent was also added with the carbon black, at a rate of 3 to 4 parts per hundred of elastomer. The stage 1 masterbatch was then dumped and passed through an open mill three times and stored at room temperature for 2 hours. The second stage chamber temperature was also set at 80° C. and 60 rpm. After conditioning to 100° C., the masterbatch was introduced to the mixer, masticated for one minute, and the antioxidant was then added. At four minutes or when a temperature of 160° C. is reached, the stage 2 masterbatch was dumped and passed through the open mill 3 times and stored at room temperature for 2 hours. The third stage chamber temperature was set at 80° C. and 35 rpm. The masterbatch from stage 2 was then added to the mixer and masticated for 1 minute. The curing package was then added and the stage 3 material was dumped at 2 minutes and passed through an open mill 3 times.

Table 7 below compares hysteresis and abrasion characteristics for elastomers compounded with TEOS-CB using two and three stage mixing. As can be seen from the Table, three stage mixing results in higher tan δ at 0° C. and lower tan δ at 70° C. Elastomeric compounds employing the elastomer set forth in Table 1A may be formulated by following the foregoing procedure.

TABLE 7

Dynamic Hysteresis Data - 2 Stage v. 3 Stage Mixing

| Carbon Black | Si-69 | tan δ at 0° C. | tan δ at 70° C. | abrasion at 14% slip |
|---|---|---|---|---|
| Duradene 715 Two Stage Mixing | | | | |
| N234 | 0 | 0.458 | 0.189 | 100 |
| N234 | 3 | 0.439 | 0.170 | 103.5 |
| TEOS-CB | 0 | 0.434 | 0.150 | 78.1 |
| TEOS-CB | 3 | 0.436 | 0.131 | 97.2 |
| Duradene 715 Three Stage Mixing | | | | |
| N234 | 0 | 0.471 | 0.165 | 100 |
| N234 | 3 | 0.456 | 0.146 | 98.4 |
| TEOS-CB | 0 | 0.446 | 0.139 | 57.6 |
| TEOS-CB | 3 | 0.461 | 0.113 | 101.8 |

Example 8
Oxidized Carbon Black

In another aspect of the present invention, it was determined by the present inventors that oxidation of the silicon-treated carbon black can lead to elastomeric compositions with enhanced hysteresis. For a black made using the conditions of Table 1, but with OMTS as the volatizable silicon-containing compound, and 2.74% silicon in the final black, the improvement obtained with oxidation is illustrated in the following Table. The hysteresis performance with the oxidized black is further enhanced by incorporating a coupling agent into the elastomeric compound.

The oxidized carbon black was prepared by treating the black with nitric acid. A small stainless steel drum was loaded with carbon black and rotated. During rotation a 65% nitric acid solution is sprayed onto the carbon black, until 15 parts per hundred carbon black had been added. After a soak period of 5 minutes, the drum was heated to about 80° C. to initiate the oxidation reaction. During the oxidation reaction, the temperature increased to about 100°–120° C. This temperature was held until the reaction was completed. The treated black was then heated to 200° C. to remove residual acid. The treated black was then dried overnight at 115° C. in a vacuum oven. Table 8 below compares hysteresis characteristics for elastomers compounded with OMTS-CB and oxidized OMTS-CB, with and without a coupling agent. Additional elastomeric compounds employing the elastomers set forth in Table 1A may be formulated by following the foregoing procedure.

TABLE 8

Dynamic Hysteresis Data - oxdized treated carbon black

| Carbon Black Duradene 715 - 2 stage | Si-69 | tan δ at 0° C. | tan δ at 70° C. |
|---|---|---|---|
| N234 | 0 | 0.513 | 0.186 |
| N234 | 3 | 0.463 | 0.176 |
| OMTS-CB | 0 | 0.501 | 0.166 |
| OMTS-CB | 3 | 0.467 | 0.135 |
| oxidized OMTS-CB | 0 | 0.487 | 0.154 |
| oxidized OMTS-CB | 3 | 0.467 | 0.133 |

Example 9
Hysteresis and Abrasion Resistance for a Variety of Elastomers

Hysteresis and abrasion resistance was compared for elastomeric compounds prepared with treated carbon blacks compounded with different elastomers, compounded with and without a coupling agent. Conventional carbon black was used as a control. The results are set forth in the Table 9 below.

These data show hysteresis improvement for all five elastomer systems tested. For example, the tan δ at 70° C. is reduced by between 10.5 and 38.3% without a coupling agent, and by between 11.7 and 28.2% with a coupling agent, compared to the corresponding control.

It can also be seen that in all cases abrasion resistance for the treated carbon black compound compared to the untreated control decreases when no coupling agent is used. Abrasion resistance is substantially improved when the coupling agent is used. It can also be seen that the hysteresis balance is improved with treated carbon black (with or without coupling agent), compared to control carbon black.

TABLE 9

Hysteresis and Abrasion Resistance - 3 Stage Mixing

| Carbon Black | Si-69 | tan δ at 0° C. | tan δ at 70° C. | wear at 14% slip |
|---|---|---|---|---|
| Solution SBR 116/NS 114 - 80/20 blend | | | | |
| N234 | 0 | 0.689 | 0.151 | 100.0 |
| N234 | 3 | 0.750 | 0.131 | 123.1 |
| TEOS-CB | 0 | 0.721 | 0.115 | 86.3 |
| TEOS-CB | 3 | 0.751 | 0.094 | 115.4 |
| Solution SBR SL 574 | | | | |
| N234 | 0 | 0.286 | 0.118 | 100.0 |
| N234 | 3 | 0.260 | 0.108 | 96.4 |
| TEOS-CB | 0 | 0.246 | 0.101 | 58.0 |
| TEOS-CB | 3 | 0.258 | 0.093 | 86.8 |
| Solution SBR PAT589 | | | | |
| N234 | 0 | 0.676 | 0.190 | 100.0 |
| N234 | 3 | 0.686 | 0.182 | 99.1 |
| TEOS-CB | 0 | 0.698 | 0.170 | 82.4 |
| TEOS-CB | 3 | 0.726 | 0.150 | 134.2 |

TABLE 9-continued

Hysteresis and Abrasion Resistance - 3 Stage Mixing

| Carbon Black | Si-69 | tan δ at 0° C. | tan δ at 70° C. | wear at 14% slip |
|---|---|---|---|---|
| Emulsion SBR 1500 | | | | |
| N234 | 0 | 0.299 | 0.176 | 100.0 |
| N234 | 3 | 0.285 | 0.137 | 87.9 |
| TEOS-CB | 0 | 0.280 | 0.156 | 60.1 |
| TEOS-CB | 3 | 0.270 | 0.121 | 88.1 |
| Natural Rubber SMR 5 | | | | |
| N234 | 0 | 0.253 | 0.128 | 100.0 |
| N234 | 3 | 0.202 | 0.088 | 85.8 |
| TEOS-CB | 0 | 0.190 | 0.079 | 60.9 |
| TEOS-CB | 3 | 0.173 | 0.069 | 88.6 |

Example 10

Cut Chip Resistance

A carbon black made as described earlier is used to make a truck-tire tread compound. The properties of the OMTS-CB are described in Table 10. The elastomeric composition is described in Table 11. The mixing procedure is similar to Example 4 except that ZnO and Circo Light Oil (obtained from Natrochem Inc., Savannah, Ga.) were added with the stearic acid, anti-oxidants (Flexzone 7P®) and AgeRite Resin D (obtained from R. T. Vanderbilt Co., Norwalk, Conn.)) and the wax, Sunproof Improved (obtained from Uniroyal Chemical Co., Middlebury, Conn.).

The tensile strength and elongation at break were measured using the method described in ASTM D-412. The tearing strength was measured using the method described in ASTM D-624. As can be seen from Table 12, OMTS-CB gave a 19% improvement in tear strength, a 13% improvement in elongation at break, and a 36% reduction in tan δ at 70° C. at comparable tensile strength. This shows that the cut-chip resistance and heat build-up properties are improved with OMTS-CB.

TABLE 10

| | OMTS-CB |
|---|---|
| % Si in Carbon Black | 4.62 |
| DBP, cc/100 g | 106.3 |
| CDBP, cc/100 g | 100.1 |
| t-Area, m²/g | 121.0 |

TABLE 11

| INGREDIENT | Parts By Weight | Parts By Weight |
|---|---|---|
| NR (SMR5) | 100 | 100 |
| N234 | 50 | — |
| OMTS-CB | — | 50 |
| Circo Light Oil | 5.0 | 5.0 |
| Zinc Oxide | 5.0 | 5.0 |
| Stearic Acid | 3.0 | 3.0 |
| Flexzone 7P ® | 1.5 | 1.5 |
| AgeRite Resin D | 1.5 | 1.5 |
| Sunproof Improved | 1.5 | 1.5 |
| Durax ® | 1.2 | 1.2 |
| Sulfur | 1.8 | 1.8 |

TABLE 12

| | Tensile Strength, mPa | Elongation @ Break, % | Tear Strength Index, % | tan δ @ 70° C. |
|---|---|---|---|---|
| N234 | 27.2 | 552 | 100 | 0.133 |
| OMTS-CB | 26.9 | 624 | 119 | 0.086 |

Example 11

To evaluate the use of the silicon-treated carbon blacks of the present invention in a wire breaker compound, the following experiment was conducted.

Nine compounds were prepared using N 326, N 231 and the OMTS-CB described in the previous example. The analytical properties of these carbon blacks are described in Table 13.

TABLE 13

| CARBON BLACK ANALYTICAL PROPERTIES | | | |
|---|---|---|---|
| | N326 | N231 | OMTS-CB |
| CTAB, m²/g | 81 | 108 | 125 |
| DPB absorption, cc/100 g | 72 | 92 | 104 |
| CDBP, cc/100 g | 67 | 86 | 101 |

Generally, heat build-up, as measured by tan δ at 60° C., and adhesion, increases with increase in surface area and structure.

The compound formulations are shown in Table 14. NR is SMR CV60 (obtained from Malaysia), silica is Hi-Sil 233 (obtained from PPG Industries, Inc., Pittsburgh, Pa.). Naphthenic oil is a processing agent (obtained from Harwick Chemical Corporation, Akron, Ohio). Resorcinol is a bonding agent (obtained from Indspec Chemical, Pittsburgh, Pa.). Cobalt naphthenate is a bonding agent (Cobalt content 6%, obtained from the Shepard Chemical Co., Cincinnati, Ohio). Hexa is hexamethylenetetramine, a bonding agent (obtained from Harwick Chemical Corporation, Akron, Ohio).

TABLE 14

| Ingredients | Parts Per Hundred | | |
|---|---|---|---|
| NR | 100 | 100 | 100 |
| Carbon Black | 55 | 55 | 40 |
| Precipitated Silica | — | — | 15 |
| Napthenic Oil | 5 | 5 | 5 |
| ZnO | 10 | 10 | 10 |
| Stearic Acid | 2 | 2 | 2 |
| Resorcinol | — | — | 2.5 |
| Hexa | — | — | 1.6 |
| Cobalt Naphthalene (6% Co) | — | 2 | — |
| Santocure MDR | 0.8 | 0.8 | 0.8 |
| Sulfur | 4 | 4 | 4 |

TABLE 15

| BONDING AGENT | N326 | | | N231 | | | OMTS-CB | | |
|---|---|---|---|---|---|---|---|---|---|
| SYSTEMS* | CTL | Co | HRH | CTL | Co | HRH | CTL | Co | HRH |
| Tensile Strength, MPa | 26.3 | 27.1 | 26.6 | 27.4 | 28.5 | 26.9 | 26.4 | 25.2 | 27.6 |
| Elongation at Break, % | 498 | 527 | 494 | 534 | 527 | 500 | 409 | 490 | 474 |
| Hardness, Shore A | 67 | 67 | 74 | 71 | 71 | 78 | 65 | 70 | 74 |
| Adhesion Strength, lb. | 68 | 95 | 45 | 94 | 106 | 45 | 90 | 107 | 91 |
| Wire Adhesion Appearance Rating** | G | G | F | G | G | F | G | G | F |
| tan δ at 60° C. | 0.137 | 0.145 | 0.116 | 0.166 | 0.170 | 0.133 | 0.134 | 0.152 | 0.120 |

*Ctl-Control, without bonding agent, Co-cobalt containing bonding agent, HRH-silica-resorcinol-hexamethylene tetramine containing bonding agent.
**G = good covering; F = fair covering.

In the experiment, a passenger tire steel cord wire, 2×2× 0.25 mm, was coated with a bran plate with 63.5% by weight copper. The adhesion rating was made using ASTM D-2229. This rating has two components: the force required to remove the cord from the adhesion compound and the appearance of the removed wire. In general, the higher the force required and the higher the rating of the appearance, the better the adhesion.

It is seen that the OMTS-CB shows the favorable heat build-up properties of N326 and the same time the favorable adhesion properties of N231.

Example 12

Generally, in the production of carbon black, alkali metal salt additives are used to control carbon black structure, for example CDBP. An increase in the amount of alkali metal salt added leads to a decrease in the structure of the carbon black. Two carbon blacks were made using the method described in Example 1. The conditions of manufacture were:

TABLE 16

| CONDITIONS | N234 | TEOS-CB |
|---|---|---|
| Air Rate, kscfh | 12.8 | 12.8 |
| Gas rate, kscfh | 0.94 | 0.94 |
| Feedstock Rate, lbs/hr | 166 | 140.2 |
| Si Compound Rate, lbs/hr | 0 | 17 |
| K+ Rate, gms/hr[a] | 0.547 | 0.604 |

[a]K+ injected as a Potassium Acetate solution.

The resultant carbon blacks were analyzed for surface area, structure, and silicon content. These values are set forth in Table 17 below.

TABLE 17

| PROPERTIES | N234 | TEOS-CB |
|---|---|---|
| % Silicon in Carbon Black | 0.02 | 3.28 |
| CDBP, cc/100 g | 103 | 110 |
| t-area, m²/g | 119.2 | 121.3 |
| N₂-area, m²/g | 122.7 | 137.4 |

Thus, in this case the CDBP is found to increase by 7 points, even though the K+ rate is slightly higher in the reactor.

Example 13
Attachment of Organic Groups

OMTS-CB was made as described in Example 1, but having the following properties.

TABLE 18

| % Silicon in Carbon Black | 4.7 |
|---|---|
| DBP, cc/100 g | 103.2 |
| CDBP, cc/100 g | 101.1 |
| t-Area, m²/g | 123 |
| N₂ Area, m²/g | 164.7 |

The carbon black was treated with 0.15 mmol of 4-aminodiphenyldisulfide (APDS) per gram of black to attach an organic group based on the preferred procedure described earlier. The OMTS-CB was then compounded according to the following formulation.

TABLE 19

| Ingredient | Parts by Weight |
|---|---|
| Elastomer (Duradene 715) | 75 |
| Elastomer (Tacktene 1203) | 25 |
| Carbon Black | 75 |
| Si-69 | 4.5 |
| Oil (Sundex 8125) | 25 |
| Zinc Oxide | 3.5 |
| Stearic Acid | 2 |
| Flexzone 7P ® | 1.5 |
| Sunproof Improved | 1.5 |
| Durax ® | 1.5 |
| Vanax DPG | 1 |
| TMTD | 0.4 |
| Sulfur | 1.4 |

Tacktene 1203 is an elastomer obtained from Polysar Rubber Corporation, Canada. Vanax DPG and tetramethyl thiuran disulfide (TMTD) are accelerators obtained from R. T. Vanderbilt Co., Norwalk, Conn., and Akrochem Co., Akron, Ohio, respectively.

The mixing procedure described in Example 7 was used. The oil and Si-69 were added in the first mixing stage. The performance of the compounds is described in Table 20.

TABLE 20

| | tan δ @ 0° C. | tan δ @ 70° C. | Abrasion @ 14% Slip |
|---|---|---|---|
| OMTS-CB | 0.385 | 0.158 | 100 |
| OMTS-CB APDS | 0.307 | 0.108 | 69 |

As shown in Table 20, attaching APDS to OMTS-CB results in a 31% reduction in tan δ @ 70° C. with a 20% reduction in tan δ @ 0° C.

Example 14

TABLE 21

|  | CB-A | OMTS-CB-B | OMTS-CB-C |
|---|---|---|---|
| Carbon Black | | | |
| Silicon Content (5%) | 0 | 2.1 | 4.0 |
| $N_2SA$ t-area ($m^2/g$) | 54 | 52 | 54 |
| DBPA (ml/100 g) | 71 | 68 | 70 |
| Physical Properties | | | |
| Recipe | 1 | 2 | 3 |
| Hardness (Shore A) | 66 | 65 | 66 |
| Tensile (MPa) | 15.5 | 17.8 | 19.4 |
| Elongation (%) | 276 | 271 | 300 |
| Tear, Die C (kN/m) | 23.6 | 24.2 | 25.4 |

|  | CB-D | OMTS-CB-E | OMTS-CB-F |
|---|---|---|---|
| Carbon Black | | | |
| Silicon Content (%) | 0 | 1.6 | 4.1 |
| $N_2SA$ t-Area ($m^2/g$) | 54 | 51 | 52 |
| DBPA (ml/100 g) | 105 | 98 | 102 |
| Physical Properties | | | |
| Recipe | 1 | 2 | 3 |
| Hardness (Shore A) | 64 | 68 | 66 |
| Tensile (MPa) | 16.2 | 19.4 | 18.6 |
| Elongation (%) | 255 | 265 | 276 |
| Tear, Die C (kN/m) | 22.9 | 24.3 | 26.3 |

TABLE 22

| RECIPES | | | |
|---|---|---|---|
| Ingredient (Parts by Weight) | 1 | 2 | 3 |
| Royalene 509 EPDM | 100 | 100 | 100 |
| AZO-66 Zinc Oxide | 4 | 4 | 4 |
| Hystrene Stearic Acid | 1 | 1 | 1 |
| Carbon Black | 60 | 60 | 60 |
| Sunpar 2280 Paraffinic Oil | 25 | 25 | 25 |
| Rubbermakers Sulfur | 2.5 | 2.5 | 2.5 |
| Methyl Tuads | 1 | 1 | 1 |
| Rhenogram MBT-75 (75% active) | 2 | 2 | 2 |
| Si-69 | 0 | 1.2 | 2.4 |
| TOTALS | 195.5 | 196.7 | 197.9 |

SUPPLIERS OF INGREDIENTS

| | |
|---|---|
| Royalene 509 EPDM | Uniroyal Chemical Co. |
| AZO-66 Zinc Oxide | Sarco, Inc. |
| Hystrene Stearic Acid | Humko Chemical Co. |
| Sunpar 2280 Paraffinic Oil | Sun Refining and Marketing |
| Rubbermakers Sulfur | R.E. Carroll |
| Methyl Tuads | R.T. Vanderbilt |
| Rhenogran MBT-75 (75% active) | Rheinchemie Corp. |
| Si-69 | Degussa |

As seen from the above EPDM examples, the use of silicon-treated carbon black substantially improves tensile, elongation, and tear strength at comparable hardness levels. These improvements in physical properties would provide advantages in useful lifetimes of seals, boots, and general molded rubber parts. Similar advantages for the silicon-treated carbon blacks would be envisaged in peroxide cured elastomers which, for example, do not obtain unsaturated double bonds such as EPM, or which may not need additional coupling agents to achieve their desirable properties.

Advantages for the silicon-treated carbon blacks would also be expected in elastomers containing elements other than carbon and hydrogen which would give additional interactions with the silicon-containing domains in the carbon blacks. Examples of elastomers containing non-hydrocarbon groups would include but not be limited to NBR (acrylonitrile-butadiene rubber), XNBR (carboxylic-acrylonitrile-butadiene rubber), HNBR (hydrogenated-acrylonitrile-butadiene rubber), CR (chloroprene rubber), ECO (ethylene oxide-chloromethyl oxirane), TPO (polypropylene oxide-allyl glycidyl ether), PPO (polypropylene oxide), CSM (chloro-sulfonyl-polyethylene), CM (chloro-polyethylene), BIIR (bromo-isobutene-isoprene rubber), CIIR (chloro-isobutene-isoprene rubber), ACM (copolymers of ethyl or other acrylate and small amount of vulcanizable co-monomer), and AEM (copolymers of ethyl or other acrylate and ethylene).

Example 15

The properties of N 234 carbon black were compared against OMTS-CB-G of the present invention in Table 23. The carbon blacks were prepared according to the process described in Example 1 and had the properties set forth in Table 23. The various formulations and the mixing procedure used to produce the rubber compound using these blacks are described in Tables 24 and 25. The loss compliance of rubber compounds is shown in Table 26. It is known that in a conventional carbon black loaded system, an increased level of curatives leads to lower loss compliance. In this case it is seen that even though the silicon treated carbon black has an increased level of curatives, it has a higher loss compliance. The use of a coupling agent is seen to lead to an even higher loss compliance.

TABLE 23

Analytical Properties of the Fillers Used for Tread Compounds

| Filler | % Si | DBP, mL/100 g | CDBP, mL/100 g | Surface area, BET, $N_2$, $m^2/g$ | t-area, $m^2/g$ |
|---|---|---|---|---|---|
| N234 | 0.0 | 125.8 | 100.7 | 121.0 | 119.0 |
| OMTS-CB-G | 4.88 | 102.3 | 100.3 | 154.3 | 121.4 |

TABLE 24

| Formulation | | | | | |
|---|---|---|---|---|---|
|  | N 234 | OMTS-CB-G-A | OMTS-CB-G-B | OMTS-CB-G-C | OMTS-CB-G-D |
| SSBR (Duradene 715) | 70 | 70 | 70 | 70 | 70 |
| BR (Tacktene 1203) | 30 | 30 | 30 | 30 | 30 |
| N 234 | 70 | — | — | — | — |

TABLE 24-continued

| | Formulation | | | | |
|---|---|---|---|---|---|
| | N 234 | OMTS-CB-G-A | OMTS-CB-G-B | OMTS-CB-G-C | OMTS-CB-G-D |
| OMTS-CB-G | — | 70 | 70 | 70 | 70 |
| Si 69 | — | 0 | 2 | 0 | 0 |
| Oil (Sundex 8125) | 28 | 28 | 28 | 28 | 28 |
| Zinc Oxide | 3.5 | 3.5 | 3.5 | 3.5 | 3.5 |
| Stearic Acid | 2 | 2 | 2 | 2 | 2 |
| Antioxidant (Flexzone7P) | 2 | 2 | 2 | 2 | 2 |
| Wax (Sunproof Improved) | 2.5 | 2.5 | 2.5 | 2.5 | 2.5 |
| Durax ® | 1.35 | 1.5 | 1.5 | 1.5 | 1.5 |
| Vanax ® DPG[a] | — | 0.66 | 1 | 0.33 | 0.33 |
| TMTD[b] | — | 0.0 | 0.4 | 0.2 | 0.2 |
| Sulfur | 1.35 | 1.4 | 1.4 | 1.4 | 1.4 |

[a]Accelerator, diphenyl guanidine.
[b]Accelerator, tetramethyl thiuram disulfide.

TABLE 25

Mixing Procedure for Tread Compounds of Passenger Tire

| Stage 1 | Brabender Plasti-corder EPL-V |
| | 60 rpm, 80° C., air on, start all mixes @ 100° C. |
| 0' | Add polymer. |
| 1' | Add filler, coupling agents (preblended). |
| @ 160° C. | Add oil. |
| 7', @ 165° C. | Dump. |
| | Pass through open mill 3 times. |
| | Sit at room temperature for at least 2 hours. |
| Stage 2 | 60 rpm, 80° C., air on, start all mixes @ 100° C. |
| 0' | Add masterbatch from stage 1. |
| 1' | Add ZnO, stearic acid. |
| 3' | Add Flexzone 7P and Wax |
| 4', @ 165° C. | Dump. |
| | Pass through open mill 3 times. |
| | Sit at room temperature for at least 2 hours. |
| Stage 3 | 35 rpm, 80° C., air on, start all mixes @ 100° C. |
| 0' | Add masterbatch from stage 2. |
| 1' | Add curatives. |
| 2' | Dump. |
| | Pass through open mill 3 times |

TABLE 26

| | | Compliance | |
|---|---|---|---|
| | | Compliance (l/G), MPa$^{-1}$ | |
| Filler | Si 69, phr | @ 0.25% DSA | @ 1.5% DSA |
| N 234 | 0.0 | 0.037 | 0.044 |
| OMTS-CB-G-C | 0.0 | 0.043 | 0.051 |
| OMTS-CB-G-D | 0.0 | 0.049 | 0.056 |
| OMTS-CB-G-A | 2.0 | 0.056 | 0.065 |
| OMTS-CB-G-B | 4.0 | 0.051 | 0.059 |

All patents, patent applications, test methods, and publications mentioned herein are incorporated by reference.

Many variations of the present invention will suggest themselves to those skilled in the art in light of the above detailed disclosure. For example, the compositions of the present invention may include other reinforcing agents, other fillers, oil extenders, antidegradants, and the like. All such modifications are within the full intended scope of the claims.

What is claimed is:

1. A method of improving traction in an elastomer, comprising adding an effective amount of an aggregate comprising a carbon phase and a silicon-containing species phase to the elastomer.

2. The method of claim 1, wherein said traction is ice and/or snow traction.

3. The method of claim 1, wherein said silicon-containing species phase exists as regions primarily at the surface of the aggregate.

4. The method of claim 1, wherein said silicon-containing species phase exists as regions distributed throughout the aggregate.

5. The method of claim 1, wherein said silicon-treated carbon black is oxidized.

6. The method of claim 1, further comprising adding a coupling agent to the elastomer.

7. The method of claim 1, wherein said elastomer is selected from the group consisting of solution SBR, natural rubber, functional solution SBR, emulsion SBR, polybutadiene, polyisoprene, and blends of any of the foregoing.

8. The method of claim 1, wherein said silicon-containing species phase contains from about 0.1% to about 25% elemental silicon, by weight of said aggregate.

9. The method of claim 8, wherein said silicon-containing species phase contains from about 0.5% to about 10% elemental silicon, by weight of said aggregate.

10. The method of claim 9, wherein said silicon-containing species phase contains from about 2% to about 6% elemental silicon, by weight of said aggregate.

11. The method of claim 6, wherein said coupling agent is a silane coupling agent, a zirconate coupling agent, a titanate coupling agent, a nitro coupling agent, or a mixture of the foregoing.

12. The method of claim 6, wherein said coupling agent is a bis(3-triethoxysilylpropyl)tetrasulfane, a 3-thiocyanatopropyl-triethoxy silane, a γ-mercaptopropyl-trimethoxy silane, a zirconium dineoalkanolatodi(3-mercapto) propionato-O, a N,N'-bis(2-methyl-2-nitropropyl)-1,6-diaminohexane, or a mixture of the foregoing.

13. The method of claim 6, wherein said coupling agent is present in an amount of from about 0.1 to 15 parts per hundred of elastomer.

14. The method of claim 1, further comprising adding silica to the elastomer.

15. The method of claim 1, further comprising adding carbon black, silica, carbon black having an organic group attached thereto, or combinations thereof, to the elastomer.

16. The method of claim 6, wherein said coupling agent is present in an amount of from about 0.1 to about 6 parts per hundred of elastomer.

17. The method of claim 1, wherein at least a portion of said aggregate has an organic group attached thereto, and optionally treated with a silane coupling agent.

18. The method of claim 17, wherein said organic group is an aromatic sulfide represented by the formulas Ar—$S_n$—Ar' or Ar—$S_n$—Ar", wherein Ar and Ar' are independently arylene groups, Ar" is an aryl group and n is 1 to 8.

19. The method of claim 1, further comprising adding carbon black having an organic group attached thereto to the elastomer.

20. The method of claim 1, further comprising adding carbon black to the elastomer.

21. The method of claim 1, wherein a portion of said aggregate has an organic group attached thereto and said method further comprises adding carbon black having an organic group attached thereto, silica, carbon black, or mixtures thereof, to the elastomer.

22. The method of claim 1, wherein said elastomer is ethylene propylene diene monomer rubber, poly chloroprene, natural rubber, hydrogenated nitrile butadiene rubber, nitrile butadiene rubber, chlorinated polyethylene, styrene butadiene rubber, butyl rubber, polyacrylic rubber, polyepichlorohydrin, ethylene vinyl acetate or blends of the foregoing.

23. The method of claim 22, wherein said aggregate is present in an amount of from about 10 to about 300 parts per hundred parts of said elastomer.

24. The method of claim 23, wherein said aggregate present in an amount of from about 100 to about 200 parts per hundred parts of said elastomer.

25. The method of claim 24, wherein said aggregate is present in an amount of from about 10 to about 150 parts per hundred parts of said elastomer.

26. The method of claim 25, wherein said aggregate is present in an amount of from about 20 to about 80 parts per hundred parts of said elastomer.

27. The method of claim 1, wherein said elastomer and aggregate are formed into a tire.

28. A method of improving dynamic compliance at −20° C. in an elastomer, comprising adding an effective amount of an aggregate comprising a carbon phase and a silicon-containing species phase to the elastomer.

29. The method of claim 28, wherein said silicon-containing species phase exists as regions primarily at the surface of the aggregate.

30. The method of claim 28, wherein said silicon-containing species phase exists as regions distributed throughout the aggregate.

31. The method of claim 28, wherein said silicon-containing species phase is oxidized.

32. The method of claim 28, further comprising adding a coupling agent to the elastomer.

33. The method of claim 28, wherein said elastomer is selected from the group consisting of solution SBR, natural rubber, functional solution SBR, emulsion SBR, polybutadiene, polyisoprene, and blends of any of the foregoing.

34. The method of claim 28, wherein said silicon-containing species phase contains from about 0.1% to about 25% elemental silicon, by weight of said aggregate.

35. The method of claim 34, wherein said silicon-containing species phase contains from about 0.5% to about 10% elemental silicon, by weight of said aggregate.

36. The method of claim 35, wherein said silicon-containing species phase contains from about 2% to about 6% elemental silicon, by weight of said aggregate.

37. The method of claim 32, wherein said coupling agent is a silane coupling agent, a zirconate coupling agent, a titanate coupling agent, a nitro coupling agent, or a mixture of the foregoing.

38. The method of claim 32, wherein said coupling agent is a bis(3-triethoxysilylpropyl)tetrasulfane, a 3-thiocyanatopropyl-triethoxy silane, a γ-mercaptopropyl-trimethoxy silane, a zirconium dineoalkanolatodi(3-mercapto) propionato-O, a N,N'-bis(2-methyl-2-nitropropyl)-1,6-diaminohexane, or a mixture of the foregoing.

39. The method of claim 32, wherein said coupling agent is present in an amount of from about 0.1 to about 15 parts per hundred of elastomer.

40. The method of claim 28, further comprising adding silica to the elastomer.

41. The method of claim 28, further comprising adding carbon black, silica, carbon black having an organic group attached thereto, or combinations thereof, to the elastomer.

42. The method of claim 32, wherein said coupling agent is present in an amount of from about 0.1 to about 6 parts per hundred of elastomer.

43. The method of claim 28, wherein at least a portion of said aggregate has an organic group attached thereto, and optionally treated with a silane coupling agent.

44. The method of claim 43, wherein said organic group is an aromatic sulfide represented by the formulas Ar—$S_n$—Ar' or Ar—$S_n$—Ar", wherein Ar and Ar' are independently arylene groups, Ar" is an aryl group and n is 1 to 8.

45. The method of claim 28, further comprising adding carbon black having an organic group attached thereto to the elastomer.

46. The method of claim 28, further comprising adding carbon black to the elastomer.

47. The method of claim 28, wherein a portion of said aggregate has an organic group attached thereto and said method further comprises adding carbon black having an organic group attached thereto, silica, carbon black, or mixtures thereof, to the elastomer.

48. The method of claim 28, wherein said elastomer is ethylene propylene diene monomer rubber, poly chloroprene, natural rubber, hydrogenated nitrile butadiene rubber, nitrile butadiene rubber, chlororinated polyethylene, styrene butadiene rubber, butyl rubber, polyacrylic rubber, polyepichlorohydrin, ethylene vinyl acetate or blends of the foregoing.

49. The method of claim 48, wherein said aggregate is present in an amount of from about 10 to about 300 parts per hundred parts of said elastomer.

50. The method of claim 49, wherein said aggregate present in an amount of from about 100 to about 200 parts per hundred parts of said elastomer.

51. The method of claim 50, wherein said aggregate is present in an amount of from about 10 to about 150 parts per hundred parts of said elastomer.

52. The method of claim 51, wherein said aggregate is present in an amount of from about 20 to about 80 parts per hundred parts of said elastomer.

53. The method of claim 28, wherein said elastomer and aggregate are formed into a tire.

* * * * *